Aug. 25, 1953

E. P. THIAS ET AL 2,650,298

TELEVISION BOOSTER CIRCUITS

Filed March 29, 1951

14 Sheets-Sheet 1

INVENTORS
EDWIN PAUL THIAS
THOMAS FISHER GOSSARD
WARREN WHITMORE WHITE
THOMAS LEE FISCHER

BY Ostrolenk & Faber

ATTORNEYS

Aug. 25, 1953 E. P. THIAS ET AL 2,650,298

TELEVISION BOOSTER CIRCUITS

Filed March 29, 1951 14 Sheets-Sheet 2

INVENTORS
EDWIN PAUL THIAS
THOMAS FISHER GOSSARD
WARREN WHITMORE WHITE
THOMAS LEE FISCHER

BY Ostrolenk & Faber

ATTORNEYS

TELEVISION BOOSTER CIRCUITS

INVENTORS
EDWIN PAUL THIAS
THOMAS FISHER GOSSARD
WARREN WHITMORE WHITE
THOMAS LEE FISCHER
BY Ostrolenk & Faber
ATTORNEYS Aug. 25, 1953 E. P. THIAS ET AL 2,650,298

TELEVISION BOOSTER CIRCUITS

Filed March 29, 1951 14 Sheets-Sheet 4

INVENTORS
EDWIN PAUL THIAS
THOMAS FISHER GOSSARD
WARREN WHITMORE WHITE
THOMAS LEE FISCHER
BY Ostrolenk & Faber
ATTORNEYS INVENTORS
EDWIN PAUL THIAS
THOMAS FISHER GOSSARD
WARREN WHITMORE WHITE
THOMAS LEE FISCHER
BY
Ostrolenk & Faber
ATTORNEYS Aug. 25, 1953 E. P. THIAS ET AL 2,650,298

TELEVISION BOOSTER CIRCUITS

Filed March 29, 1951 14 Sheets-Sheet 6

INVENTORS
EDWIN PAUL THIAS
THOMAS FISHER GOSSARD
BY WARREN WHITMORE WHITE
THOMAS LEE FISCHER
Ostrolenk & Faber
ATTORNEYS INVENTORS
EDWIN PAUL THIAS
THOMAS FISHER GOSSARD
WARREN WHITMORE WHITE
THOMAS LEE FISCHER
BY Ostrolenk & Faber
ATTORNEYS INVENTORS
EDWIN PAUL THIAS
THOMAS FISHER GOSSARD
WARREN WHITMORE WHITE
THOMAS LEE FISCHER
BY Ostrolenk & Faber
ATTORNEYS

SET POSITION

OFF POSITION

INVENTORS
EDWIN PAUL THIAS
THOMAS FISHER GOSSARD
WARREN WHITMORE WHITE
THOMAS LEE FISCHER
BY
Ostrolenk & Faber
ATTORNEYS INVENTORS
EDWIN PAUL THIAS
THOMAS FISHER GOSSARD
WARREN WHITMORE WHITE
THOMAS LEE FISCHER
BY
Ostrolenk & Faber
ATTORNEYS INVENTORS
EDWIN PAUL THIAS
THOMAS FISHER GOSSARD
WARREN WHITMORE WHITE
THOMAS LEE FISCHER
BY Ostrolenk & Faber
ATTORNEYS INVENTORS
EDWIN PAUL THIAS
THOMAS FISHER GOSSARD
WARREN WHITMORE WHITE
THOMAS LEE FISCHER
BY Ostrolenk & Faber
ATTORNEYS Aug. 25, 1953 E. P. THIAS ET AL 2,650,298

TELEVISION BOOSTER CIRCUITS

Filed March 29, 1951 14 Sheets-Sheet 13

INVENTORS
EDWIN PAUL THIAS
THOMAS FISHER GOSSARD
WARREN WHITMORE WHITE
THOMAS LEE FISCHER

BY Ostrolenk & Faber

ATTORNEYS

Aug. 25, 1953 E. P. THIAS ET AL 2,650,298

TELEVISION BOOSTER CIRCUITS

Filed March 29, 1951 14 Sheets-Sheet 14

INVENTORS
EDWIN PAUL THIAS
THOMAS FISHER GOSSARD
WARREN WHITMORE WHITE
THOMAS PAUL THIAS

BY Ostrolenk & Faber
ATTORNEYS

Patented Aug. 25, 1953

2,650,298

UNITED STATES PATENT OFFICE 2,650,298

TELEVISION BOOSTER CIRCUITS

Edwin Paul Thias, Los Angeles, Thomas Lee Fischer, South Gate, Thomas Fisher Gossard, North Hollywood, and Warren Whitmore White, Altadena, Calif., assignors to Standard Coil Products Co. Inc., Los Angeles, Calif., a corporation of Illinois Application March 29, 1951, Serial No. 218,162

24 Claims. (Cl. 250—20)

Our present invention relates to high frequency amplifiers and more particularly relates to television "booster" amplifier units that amplify signals from the antenna to the input of the television receivers.

The "booster" amplifiers, also called "pre-amplifiers," are used primarily to extend the range at which a receiver may be satisfactorily operated to include the "fringe" areas where the signal is beginning to fall off and more specifically to obtain an improvement in the contrast and clarity of the picture by its use.

In order to operate satisfactorily, these high frequency amplifiers, hereinafter referred to simply as boosters, must amplify equally video carrier signals, when connected into the antenna transmission line, between the antenna and the receiver.

As is well-known to those familiar with the art, the present television spectrum is divided into twelve bands numbering two to thirteen, inclusive, with channel thirteen at the highest frequency. Channels thirteen to seven, inclusive, are separated from each other by six megacycles. Channels six to two, inclusive, are separated from each other by from six to ten megacycles. Channels six and seven, however, have a separation of approximately seventy-five megacycles. The ideal frequency response would be one in which the gain is constant for all these television channels and falls off above channel 13, below channel 2 and between channels 6 and 7 in order to minimize interference arising from stray signals at these frequencies.

One of the principal distinguishing features of our present invention is then the achievement of an approximate ideal frequency response for all channels and especially the appropriate amplification at high frequencies necessary to produce a substantially flat frequency response characteristic at all channels.

In the construction and operation of commercial home television receivers, the combination of the elements and especially of the antenna results in relatively great attenuation of the high frequency television signals—those in the range particularly of channels 9, 10, 11, 12 and 13. Manufacturing and consumer requirements are such that the single antenna usually employed is cut or dimensioned for optimum reception or interception of the signal at some median channel such as channels 4, 6 or 7. Where two antennae are used, one may be cut for optimum reception at channels 3 or 4 in the low frequency range and the other for optimum reception at channels 8 or 9 in the high frequency range. These two antennae may then be controlled by an appropriate switching device or automatically by various well-known tuned couplings which will pass only the higher frequency signal from the high frequency antenna and will pass only the lower frequency signals from the low frequency antenna.

Since in virtually every case, in metropolitan areas having three or more television broadcasting stations, it is impracticable to utilize separate antennae for each channel, the compromise above noted of one or two antennae cut for optimum reception at a median frequency is the one most frequently used.

This results in attenuation particularly of the high frequency signal (channels 12 and 13) at the point of reception.

This is true despite the use of the conical, rhombic or bi-conical antennae which are regarded generally as automatically self-tuning in that only the required length of the antenna in theory is used for reception at each frequency. In fact, the signal is nevertheless attenuated at the point of reception toward the higher frequencies.

In addition, the higher the frequency and the shorter the wave length, the greater the attenuating effect of variations in atmospheric conditions and density.

This last attenuating condition, which weakens the higher frequency during transmission, is then at least added to and more frequently multiplied by the commercial requirements above described, resulting in noticeable and substantial attenuation of the signal at the higher frequencies.

Accordingly, an object of our present invention is the provision of novel means hereinafter more more specifically described and as hereinabove pointed out for obtaining the flat frequency response characteristic at all channels wherein both the video and audio outputs will be substantially equal at channel 2 and channel 13 and at all channels in between.

At the higher television frequencies the inductance of the cathode leads acquires considerable importance in that it loads the circuit which feeds the grid. In fact, the tube's input conductance corresponds to a resistance, in parallel with the input capacitance, whose value decreases inversely as the square of the frequency. This resistance consumes input power in amounts proportional to the square of the frequency for a given signal voltage. There is no real loss of power involved here. The input power consumed in this way is simply transmitted to the plate circuit. But one effect of the decreased input resistance is to reduce the voltage that can be built up in the circuit connected to the grid.

Our invention provides means to neutralize the effect of the cathode lead inductance, that is, it provides means whereby the input resistance will not decrease considerably at the higher television frequency.

Accordingly, an object of our invention is to provide novel means to neutralize the effect of cathode lead inductance at the higher television frequencies, thereby increasing selectivity and overall gain on the high television channels.

Moreover, previous boosters suffered from considerable interference due to low frequency signals, that is, signals cross-modulating the television signal in the booster amplifier.

In the booster of our present invention, practically all interference due to low frequency signals is eliminated by shunting them to ground utilizing high frequency pass filters. The high frequency channels gain is considerably improved by utilizing an improved screen grid circuit without decreasing the gain at the low channels. This elimination of frequencies lower than the television frequency band width results in approximating the ideal frequency response described above at its lower end.

Therefore, an object of our invention is to provide high frequency pass filters which eliminate interference due to low frequency signals.

An additional improvement of the present invention is matching of input and output circuits achieving balanced voltages where necessary. To be able to deliver power to a grounded amplifier through a two wire or twin lead transmission line, or, conversely, to use a coaxial transmission line to deliver power to an ungrounded system, that is a system symmetrical with respect to ground, it is necessary to convert between a balanced system symmetrical with respect to ground and an unbalanced system in which one side is grounded. It is obvious that a transformer is the best suited piece of equipment to effect such a transformation. When a bifilar wound autotransformer is used to unbalance a balanced system, each of the two leads of the twin lead transmission line is connected to one end of the two primary windings, while the other ends of the two windings are connected to ground. An output taken between one of the twin leads and ground will be an unbalanced output. The transformer performs the balance to unbalance transformation.

For the transformation from unbalanced system to balanced system, the unbalanced input is connected from one end of either winding to ground (both windings, as before, having one end grounded), the balanced output twin lead being connected across the ungrounded ends of both windings.

Matching on the other hand is used to produce conditions of maximum power transfer, that is, a load connected through a transmission line to a source is said to be matched for maximum power transfer when its complex impedance is the conjugate of the equivalent impedance of the transmission line and source. In a television receiver the input to the receiver should ideally be matched to the receiver's impedance. If a booster is used between the antenna and the receiver, the input to the booster must be matched to the booster impedance, and the output of the booster must be matched to the input of the television receiver. It is well-known in the art that such matchings can be achieved very satisfactorily by using transformers in which the transformation ratio is such that, for example, the impedance connected to the secondary winding, seen from the primary winding, matches the impedance connected to the primary winding.

Accordingly, an object of our invention is to provide means whereby a signal is first unbalanced to ground and then balanced to ground.

Another object of our invention is to provide improved antenna output to booster input matching and booster output to receiver input matching.

A further object of our invention is to utilize the same means for balancing or unbalancing and for matching.

Accuracy of tuning and tracking heretofore unobtainable in production is ensured by the use of "Printed Circuits" combining switch and tuning inductances on one printed plate.

The utilization of printed tuning inductors for television boosters has heretofore required numerous soldering operations. These soldering operations involve additional costs in material and in time besides setting up mechanical and electrostatic stresses which introduce impedance effects into the circuitry. The reduction of soldering operations and, in general, the reduction of contact surfaces would be an asset. Contact surfaces present additional impedances in the circuitry as well as the solder, depending upon the kind of materials used for each contact member, the condition of the contact surfaces, the shape of the contact surfaces and the mechanical pressure.

Accordingly, an object of our invention is to provide novel tuning inductors which are easier to manufacture and are of smaller size.

In order to achieve the novel functional aspects of our invention and in order further to provide a unit which is simplified in construction and lends itself readily to mass production techniques while at the same time operation by the unskilled user is facilitated, our invention contemplates and utilizes many novel mechanical expedients to achieve these results.

Whereas in most prior pre-amplifiers or boosters the tuning inductors were generally stationarily arranged with the conducting elements arranged to rotate about them, our novel booster is so constructed that the conducting elements are stationary and the tuning inductors rotate with respect thereto.

This permits the entire tuning assembly to be made smaller, obviates a multiplicity of soldering connections and facilitates simplified assembly.

By having the two tuning inductors on a single shaft each rotating in engagement with a pair of contacts, the previous extremely large number of soldering connections has been replaced by four soldering connections each to one of each contact while the rotatable tuning inductors require nothing but rotatable mechanical support and no electrical connection other than that of the contacts.

Thus, another object of our invention is the arrangement of the tuning inductors so that they may rotate with respect to stationary contacts, thereby making the tuning assembly much smaller and facilitating mass production assembly techniques.

In addition, the single shaft carrying the tuning inductors is mounted rotatably in two opposite walls of the chassis unit and held in place by a simple spring arrangement. The operator in assembling the unit need merely slip the shaft in a hollow bearing on one wall and drop the other end of the shaft in an opposite wall, thereafter adding a spring holder to retain the shaft in position in the slot.

In this way even the operating knob may be pre-assembled on the shaft, if desired, prior to the assembly of the entire unit.

In order to reduce the size of the unit, the chassis plate itself is provided with two slots, the material from which not only contributes to the strength of the chassis but also serves as an electrostatic shield between the two tuning inductors.

A further object of our invention, therefore, is also the provision of a novel tuning inductor for a booster or preamplifier so arranged that a minimum of moving parts is provided, the actual moving parts in our novel tuning unit comprising only the two inductor elements on their shaft and the knob for operating the same.

Another object of our invention is the provision of a novel switch arrangement having an "off," a "set" position, an "on" position and a "tune" position, the latter combining in a single operating knob the fine or vernier tuning function.

When the booster switch knob is at the "off" position, the booster is completely off. When the booster knob is turned to the "set" position, a by-pass circuit is established in the booster unit whereby all of the amplifier elements of the booster are by-passed and the television set receives its signal directly from the antenna without pre-amplification. However, the tube heater is energized when switch knob is in the "set" position so that it is not necessary to wait for the booster to "warm up" when it is later turned to the "on" position.

Accordingly, a further object of our invention is the provision of a novel switching arrangement that permits placing the booster between the antenna and the operating television receiver without waiting for the "warm up" period.

When the switch knob is turned to the "on" position, then the amplifier is cut into the circuit so that the set now receives its signals from the pre-amplifier or booster. The fourth and following position of the switch knob is the "tune" position wherein after the pre-amplifier or booster has been placed in the "on" position the pre-amplifier or booster itself may be fine tuned in order to further improve picture or sound reception.

The switch operator knob is connected to and rotates a shaft mounted in the chassis substantially in the same manner as the tuning shaft is mounted.

The slide switch elements are mounted substantially parallel to the switch operating shaft. A bell crank lever on the floor of the chassis is connected at one end to the switch operator and is adapted to move the slide switch from the "set" to the "on" position and vice versa.

The opposite end of the bell crank lever is bifurcated to form a slot which may be entered by a pin or crank extension from the switch operating shaft.

In the "set" position this pin or crank extension enters the slot formed by the bifurcated end of the bell crank lever to rotate the bell crank lever to a position where the slide switch operator is pulled to the "on" position.

When the switch knob is turned to the "set" position, the rotation of the shaft rotates the pin and thereafter rotates the bell crank lever to operate the switch to a position where a circuit is established by-passing the pre-amplifying elements of the booster and establishing a direct connection from the antenna to the television set itself.

When the switch knob is turned to the "on" position, the pin on the switch operating shaft moves the bell crank lever and the slide switch to a position where a circuit is established from the antenna through the preamplifier or booster elements to the set.

Thereafter, further rotation of the switch operating shaft will cause the switch operating pin on the shaft to leave the bifurcated slot at the end of the bell crank lever so that further rotation of this knob will not affect the "on" position of the switch.

Thereafter the knob and shaft may be rotated to achieve a fine tuning operation as hereinafter described, but when it is desired to return the pre-amplifier or booster once more to the "set" or "off" position, on rotation of the knob to the "on" position the pin or crank on the switch operating shaft enters the bifurcated slot and may now move the bell crank lever and the slide switch to the "set" position. Further rotation of the knob to the "off" position operates a snap action switch in the A. C. line (hereinafter referred to as the line switch) to disconnect the power to the booster.

This operation by which the same operating shaft may be used to effect a fine tuning and a switch operation is made possible by reason of the fact that the bell crank lever rotates in a plane tangent to the arc of rotation of the switch operating shaft and its pin or crank so that the pin or crank of the switch operating shaft will leave the slot in the bell crank lever after a predetermined angle of rotation.

Thus, another object of our invention is the provision of a novel combined switch and fine tuning device which provides a multiplicity of switch connections or settings and permits the operating element in the switch device after a desired setting has been reached to rotate free of the switch without affecting the switch and operating the fine tuner.

The switch operating knob is provided with a camming surface on its interior which engages a movable shaft operating in a tubular capacitor, the movement of the shaft in the tubular capacitor varying its capacitance.

An appropriate spring maintains the shaft against the cam surface of the operating knob. The cam surface is so arranged that no variation in the capacity of the capacitor occurs during the operation of the switch knob from "off" to "set" to "on" or in reverse, but after the "on" position is reached, the cam surface is so arranged that it will move the shaft to vary the capacitance of the capacitor, the shaft being arranged parallel to the switch operating shaft and being operated in a direction normal to the switch knob.

Accordingly, another object of our invention is to provide a novel fine tuning capacitor operated by a cam and cam follower mechanism.

In addition, an appropriate clicker type stop is incorporated in the leaf spring that actuates the A. C. line switch at the "off" position to provide a snap action feel and possibly even a slight audible indication of the fact that the "off" position has been reached.

This snap action clicker or spring or leaf spring is contacted by another cam arm on the switch operating shaft, the said crank arm also acting as a stop against extensions of the chassis at the ends of approximately 160° of rotation in order to limit the variation in the capacitance of the fine tuning capacitor and to prevent a disarrangement of the switch settings.

Thus, still a further object of our invention is the provision of a novel switch operating arm providing appropriate indication audibly and by feel of the "off" position, providing appropriate indication of the "set" or "on" position and providing appropriate indication of the "tuning" position.

In addition, the switch operating shaft and its associated elements are so arranged that they may be formed as a unit or unit sub-assembly which may readily be secured in the chassis.

In addition, a further object of our invention is the arrangement of the elements of our novel booster to facilitate assembly in that all elements which are to be mounted on the chassis are arranged for unit sub-assembly prior to mounting on the chassis.

Virtually no screw connections to the chassis are required and operating shafts as well as support plates may readily be slipped and secured into place in appropriate elements on the chassis for receiving them and by appropriate means readily connected to the chassis for maintaining them in place.

In addition and as a further object of our invention, the rotatable tuning inductors are provided with a shielding plate means which is secured in a simple manner by a screw or rivet to the chassis and an extension of which in turn furnishes a support for the insulating contact plate as well as for the variable fine tuning condenser and other components of the tuner.

In fact, it is known in the art that a current flowing in a conductor produces a magnetic field around it and, if a second conductor is located near the first, the lines of flux from the first conductor's field will interlink with the second conductor. If the current flowing in the first conductor is variable in time, it produces a magnetic field variable in time whose lines of force will cut the second conductor at a certain time rate, thus producing in the second conductor, by Lentz-Faraday's Law, an induced variable voltage. This type of coupling is undesirable when, for example, one conductor or inductor is part of the input circuit of an amplifier while the other is part of the output circuit of the same amplifier. In fact, this magnetic coupling would produce there an undesired feedback effect, that is, the output signal would be returned through magnetic coupling to the input circuit, with a phase shift, thus distorting the input signal or even under certain conditions producing self-starting oscillations.

At radio frequencies and at the higher audio frequencies, satisfactory shielding can be obtained by the use of shields having high electrical conductivity. Magnetic flux in attempting to pass through such a shield induces voltages that set up eddy currents which, in large measure, prevent the magnetic flux from penetrating through the shield.

Therefore, a further object of our invention is to provide novel shielding between the rotatable tuning inductors.

A further object of our invention is the arrangement of the tuning knob of our novel tuner so that it itself furnishes an appropriate series of stops or detents positively to position the tuning unit for each channel.

For this purpose the knob for the booster is shaped with a series of twelve lunate curves on its edge, each corresponding to a channel setting. A spring detent plate on the inside of the chassis engages these lunate curves to act as a positive yet releasable detent stop at each tuning position, obviating the need for tuning skill.

The cabinet itself is a one-piece unit made of insulating material and having a pair of slots in an upper surface through which the tuning knob and the switch knob extend. The lunate curves particularly on the tuning knob (and which are repeated for ornamental purposes on the switch knob) make it simple for the home user to operate the tuning element and the switch element while at the same time the lunate curves for the tuning knob furnish the detent arrangement described.

Thus, another object of our invention is the provision of a novel booster arrangement wherein particularly the tuning knob of substantially large diameter furnishes a positive simplified detent arrangement that indicates the appropriate tuned position.

A further object of our invention is the mechanical arrangement of all the components above described so that while a compact extremely small pre-amplifier or booster unit is provided, all of the elements are appropriately spaced electrically, are properly shielded, and nevertheless are mechanically of proper size and hence of appropriate strength to withstand the vicissitudes of home use.

These and other objects and advantages will become apparent in the following description and drawings in which:

Figure 1 is the wiring diagram of a preferred embodiment of the booster of our invention.

Figure 1*a* is the electric diagram of a triode showing the grid to cathode capacitance and cathode lead inductance.

Figure 1*b* is the plot of data showing the effect of cathode lead inductance on the input conductance of two high frequency pentodes.

Figure 1*c* is an expanded schematic view of the operative parts of our novel booster.

Figure 3 is a perspective view of the switch mechanism of our invention.

Figure 4:
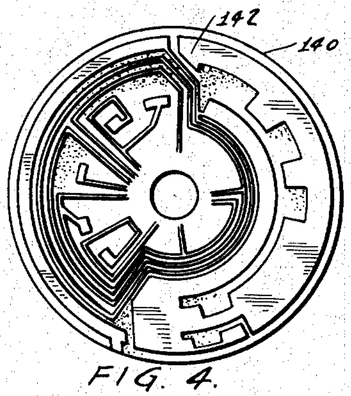
Figure 4 is a front view of the printed inductors of our invention.
Figure 4A:
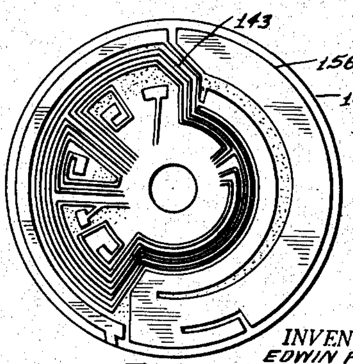

Figure 4*a* is a front view of another of the printed inductors of our invention.

Figure 5:
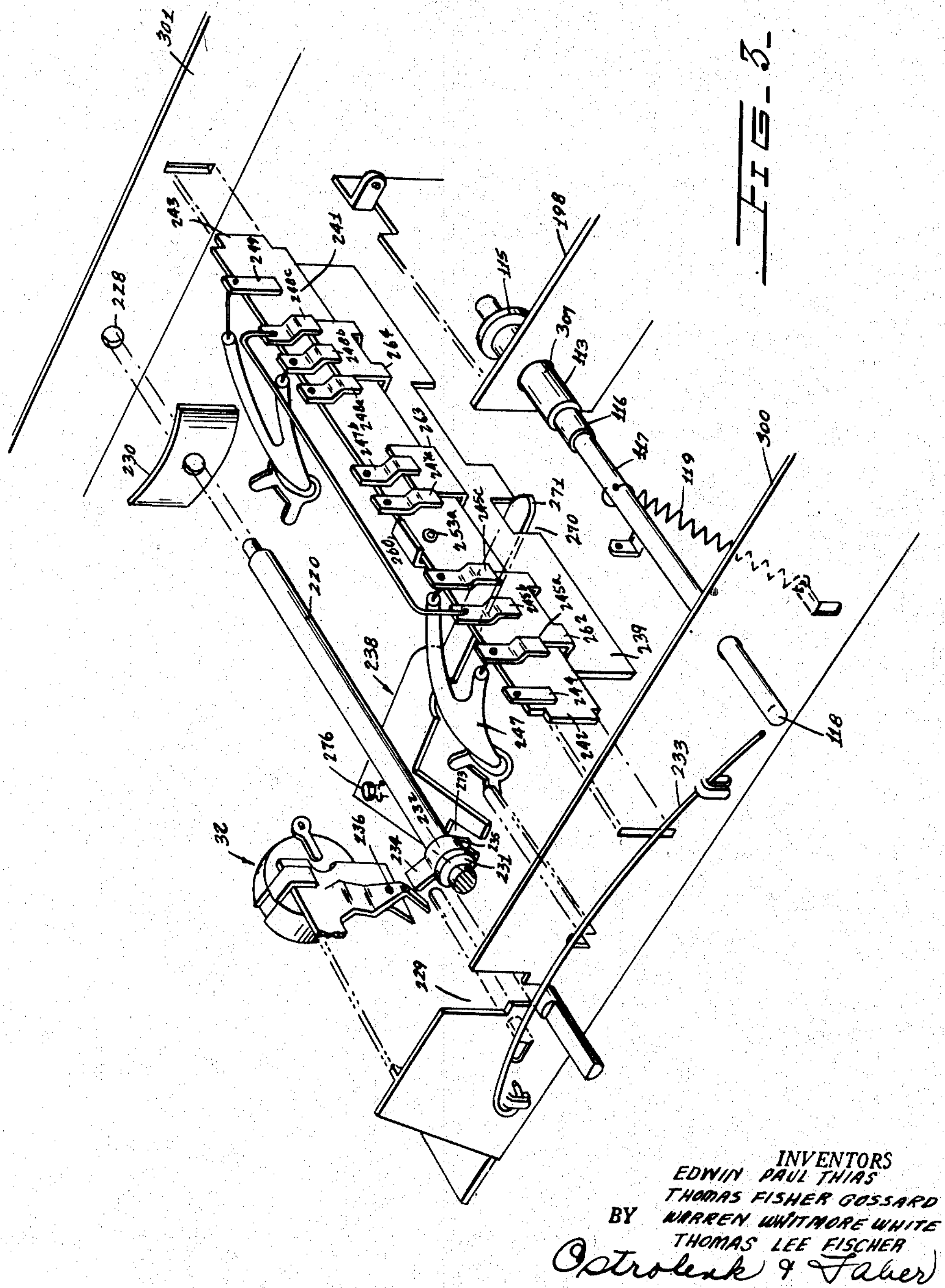

Figure 5 is a front view of the stationary spring contact of our invention.

Figures 5, 5A:
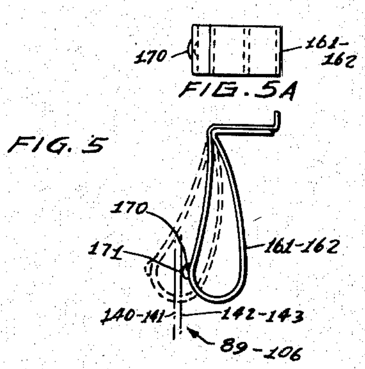

Figure 5*a* is a plan view of the stationary spring contact of our invention.

Figure 6:
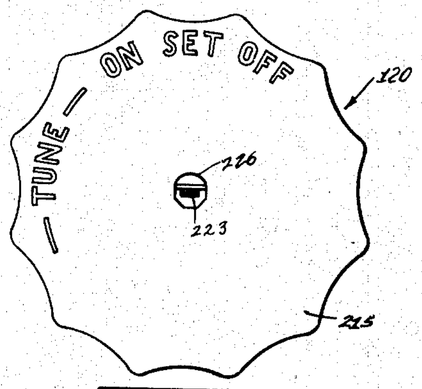

Figure 6 is a front view of the off-set-on knob of our invention.

Figure 6A:
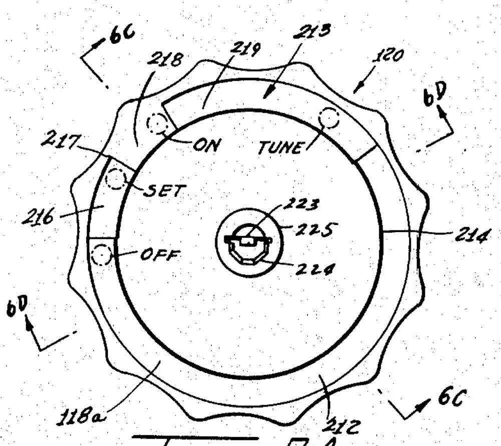

Figure 6*a* is a rear view of the off-set-on knob of our invention.

Figure 6B:
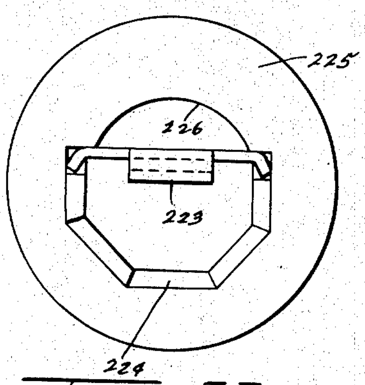

Figure 6*b* is a front view of the center opening of the off-set-on knob of our invention showing the shaft securing spring.

Figure 6C:
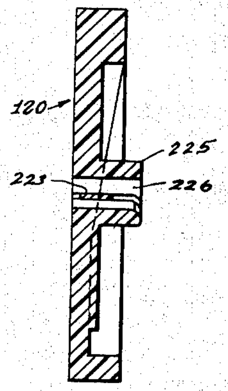

Figure 6*c* is a cross-sectional view of the off-set-on knob of our invention taken along line C—C of Figure 6*a* and looking in the direction of the arrows.

Figure 6D:
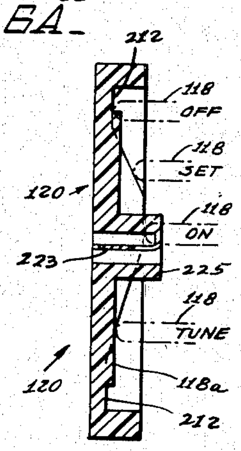

Figure 6*d* is a cross-sectional view of the off-set-on knob of our invention taken along line D—D of Figure 6*a* and looking in the direction of the arrows.

Figure 7:
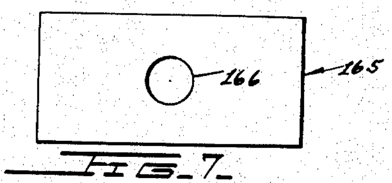

Figure 7 is a front view of the rectangular spring biasing the operating shaft axially.

Figures 7A, 9A:
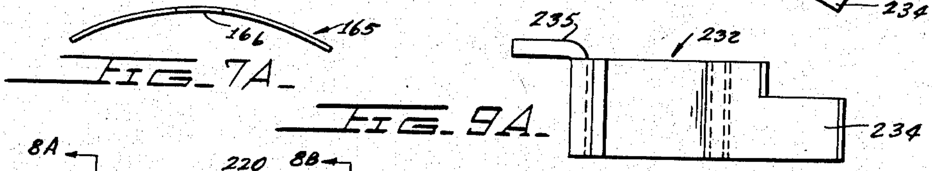

Figure 7*a* is a plan view of the rectangular spring biasing the operating shaft axially.

Figure 8:
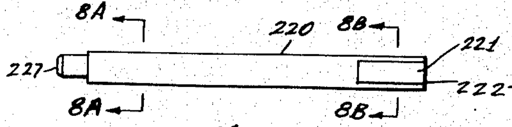

Figure 8 is a side view of the switch shaft of our invention.

Figure 8A:
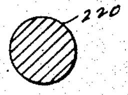
Figures 10, 14, 14A:
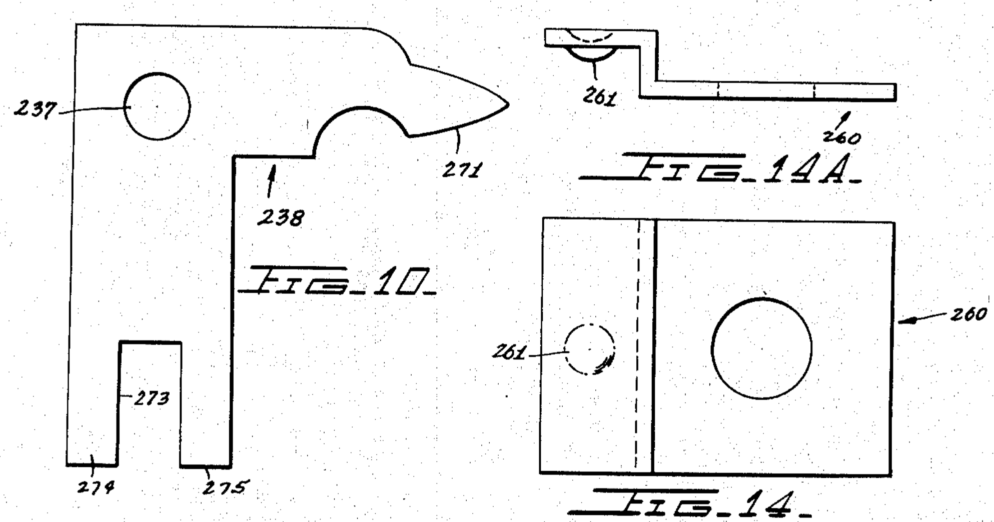

Figure 8*a* is a cross-sectional view of the switch shaft of our invention taken along line A—A of Figure 10 looking in the direction of the arrows.

Figure 8B:
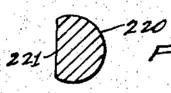

Figure 8*b* is a cross-sectional view of the switch shaft of our invention taken along line B—B of Figure 10 looking in the direction of the arrows.

Figure 9:
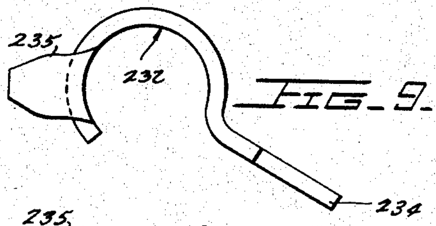

Figure 9 is a side view of the switch actuator of our invention.

Figure 9*a* is a front view of the switch actuator of our invention.

Figure 10 is a plan view of the rocker arm of our invention.

Figure 10A:
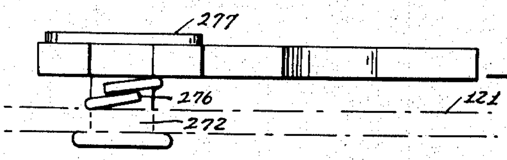

Figure 10*a* is a front view of the rocker arm of our invention showing the rocker arm biased against the rivet head.

Figure 11:
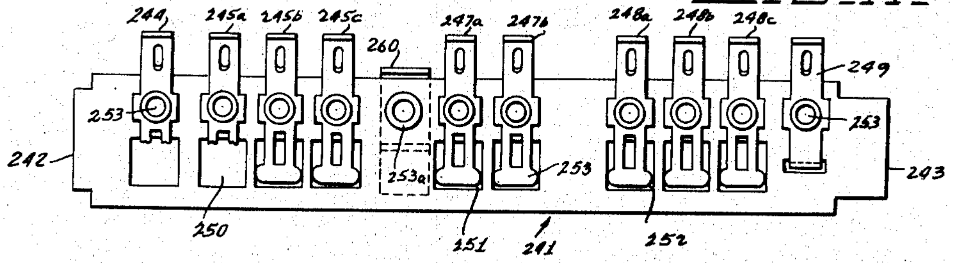

Figure 11 is a front view of the stationary assembly of the slide switch of our invention.

Figure 12:
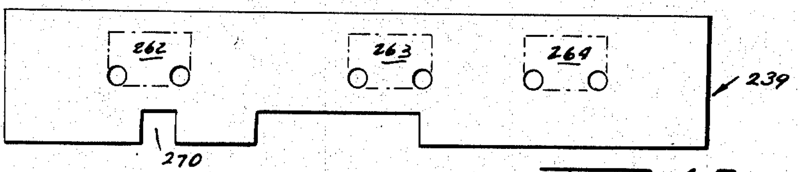

Figure 12 is a front view of the movable assembly of the slide switch of our invention.

Figure 13:
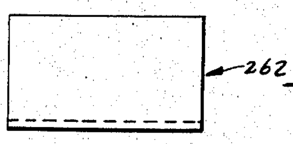

Figure 13 is a front view of a contact of the movable assembly of the slide switch of our invention.

Figure 13A:
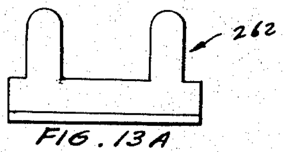

Figure 13*a* is a plan view of a rotor contact of the silde switch of our invention.

Figure 13B:
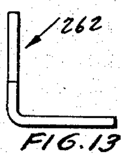

Figure 13*b* is a side view of a rotor contact of the slide switch of our invention.

Figure 14 is a front view of the movable assembly guide of the slide switch of our invention.

Figure 14*a* is a side view of the movable assembly guide of the slide switch of our invention.

Figure 15:
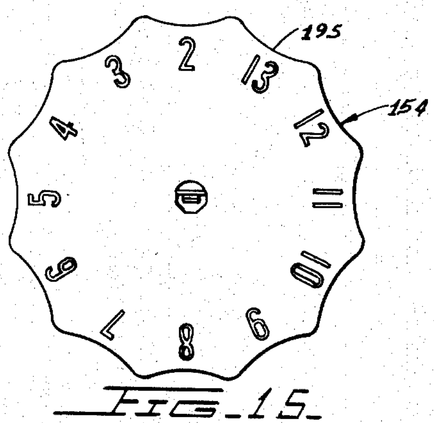

Figure 15 is a front view of the tuning knob of the booster of our invention.

Figure 15A:
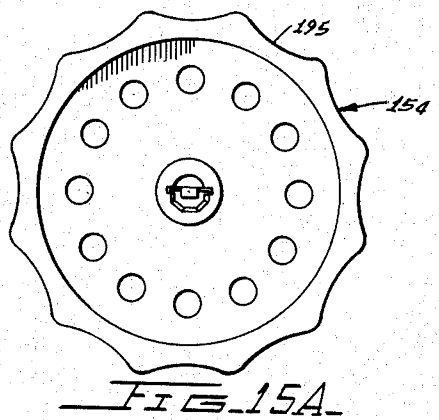

Figure 15*a* is a back view of the tuning knob of the booster of our invention.

Figures 16, 16A, 16B, 16C, 16D:
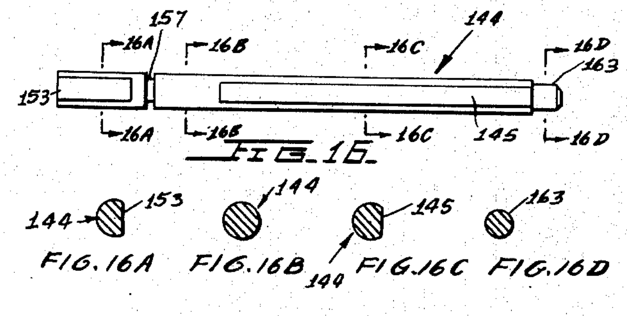

Figure 16 is a side view of the selector shaft of our invention.

Figure 16*a* is a cross-section of the selector shaft of our invention taken along line A—A of Figure 16 and looking in the direction of the arrows.

Figure 16*b* is a cross-section of the selector shaft of our invention taken along line B—B of Figure 16 and looking in the direction of the arrows.

Figure 16*c* is a cross-section of the selector shaft of our invention taken along line C—C of Figure 16 and looking in the direction of the arrows.

Figure 16*d* is a cross-section of the selector shaft of our invention taken along line D—D of Figure 16 and looking in the direction of the arrows.

Figure 17:
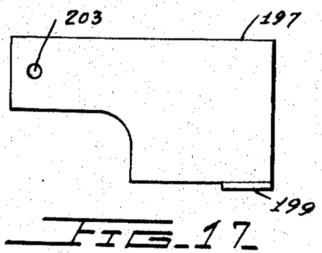

Figure 17 is a front view of the central internal shield of the booster of our invention.

Figure 17A:
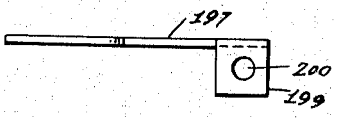

Figure 17*a* is a plan view of the central internal shield of the booster of our invention.

Figure 18:
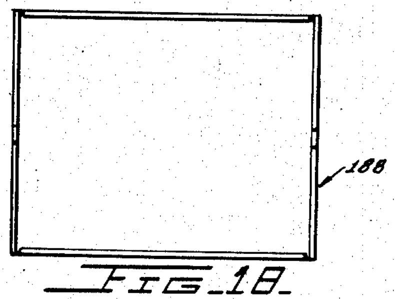

Figure 18 is a plan view of the shield cam of the booster of our invention.

Figure 18A:
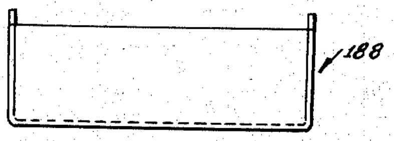

Figure 18*a* is a side view of the shield cam of the booster of our invention.

Figure 18B:
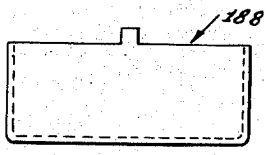

Figure 18*b* is another side view of the shield cam of the booster of our invention.

Figures 19, 19B:
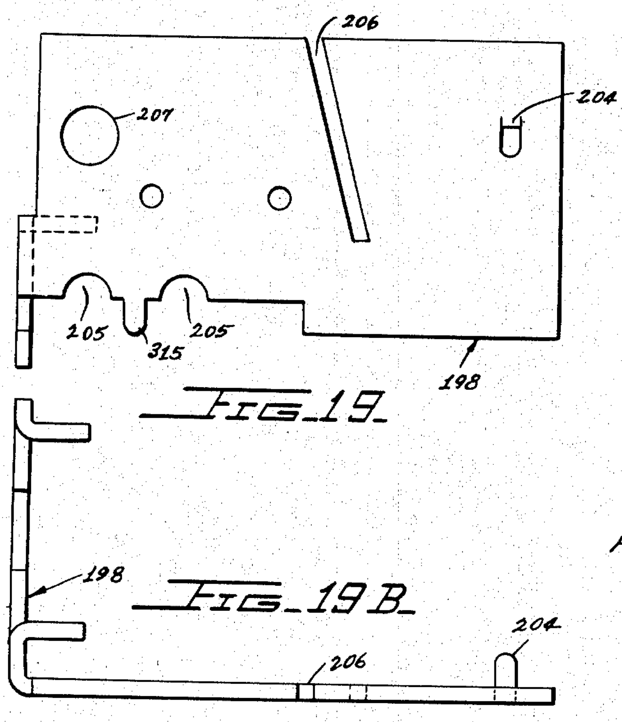

Figure 19 is a side view of the central supporting insulation of the booster of our invention.

Figure 19A:
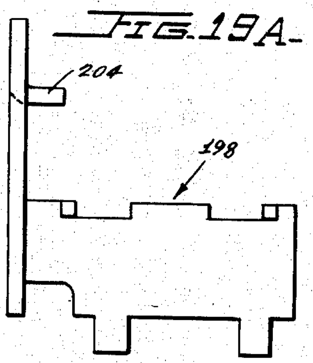

Figure 19*a* is a front view of the central supporting insulation of the booster of our invention.

Figure 19*b* is a plan view of the central supporting insulation of the booster of our invention.

Figure 20:
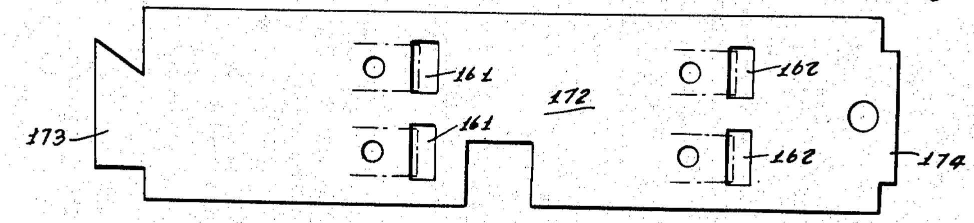

Figure 20 is a side view of the insulation supporting the inductor contacts of our invention.

Figure 21:
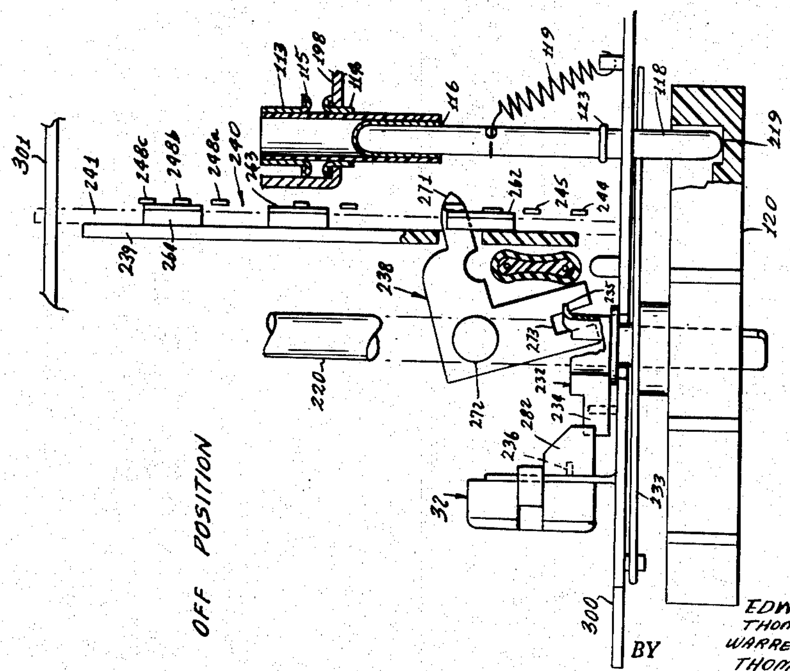

Figure 21 is a plan view of the switching mechanism and related parts of our invention for the "off" position of the off-set-on knob.

Figure 22:
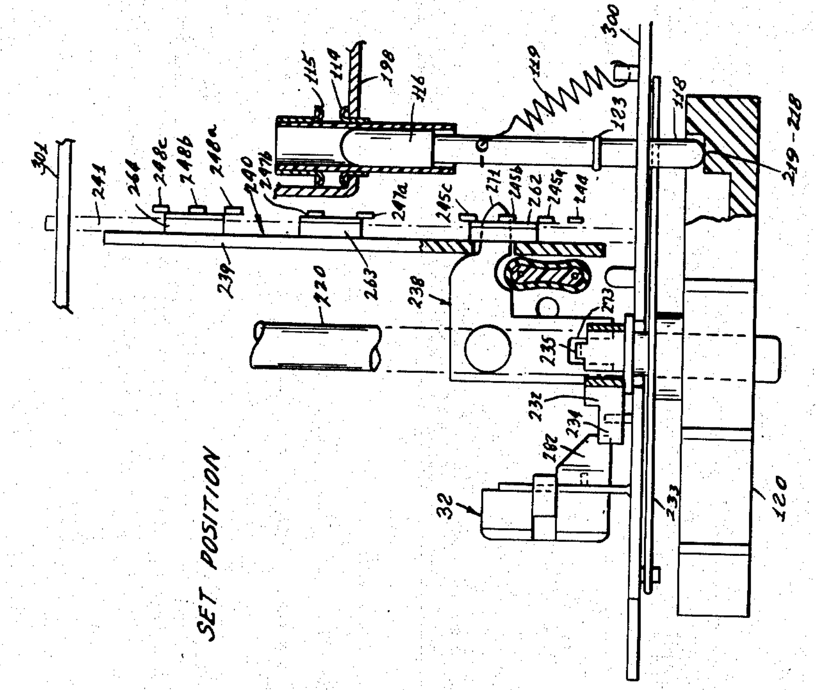

Figure 22 is a plan view of the switching mechanism and related parts of our invention for the "set" position of the off-set-on knob.

Figure 23:
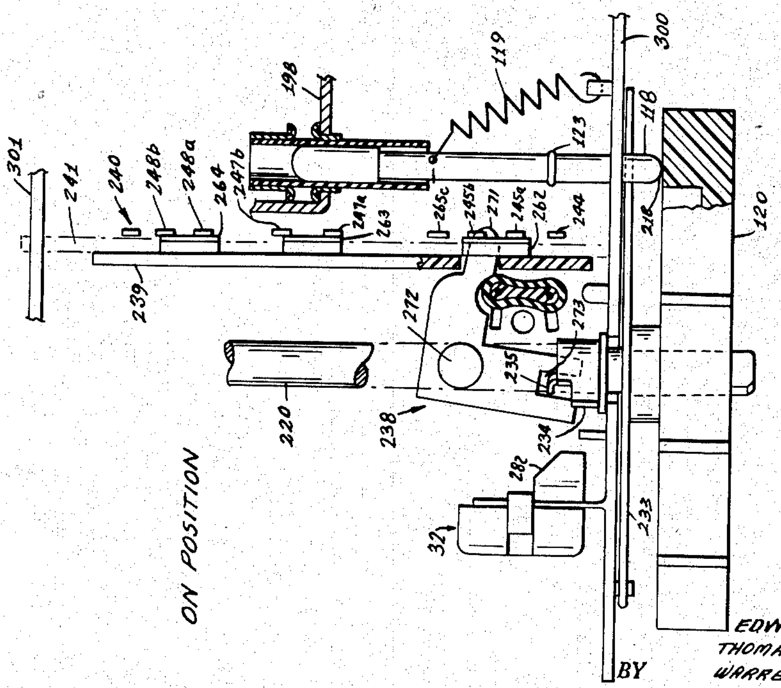

Figure 23 is a plan view of the switching mechanism and related parts of our invention for the "on" position of the off-set-on knob.

Figure 24:
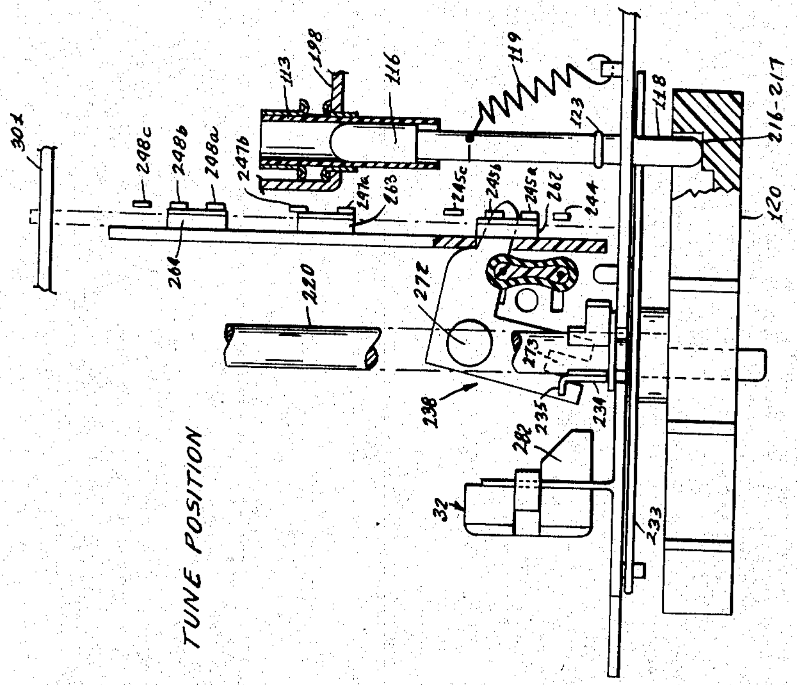

Figure 24 is a plan view of the switching mechanism and related parts of our invention for the "tune" position of the off-set-on knob.

Figure 25:
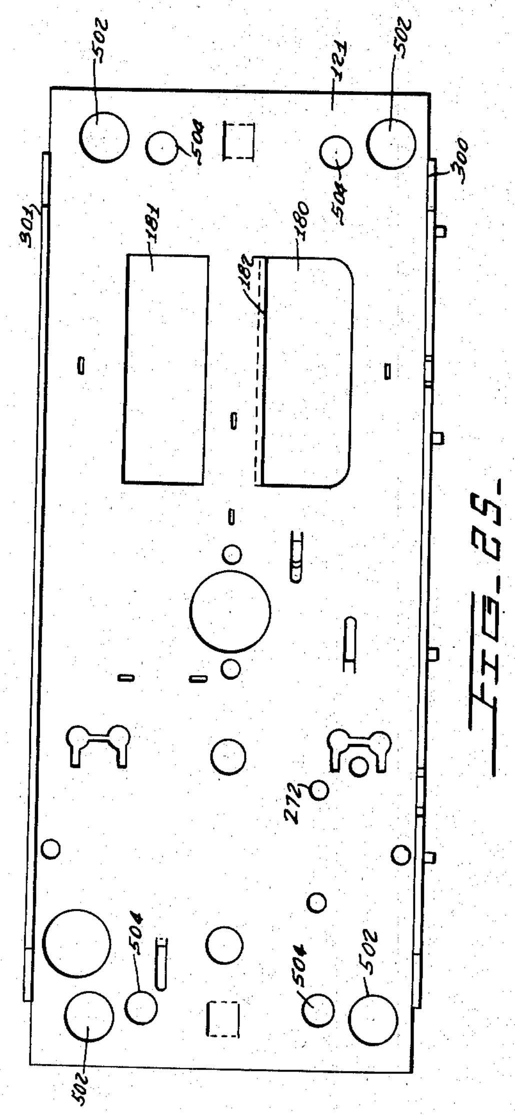

Figure 25 is a plan view of the chassis of the booster of our invention.

Figure 25A:
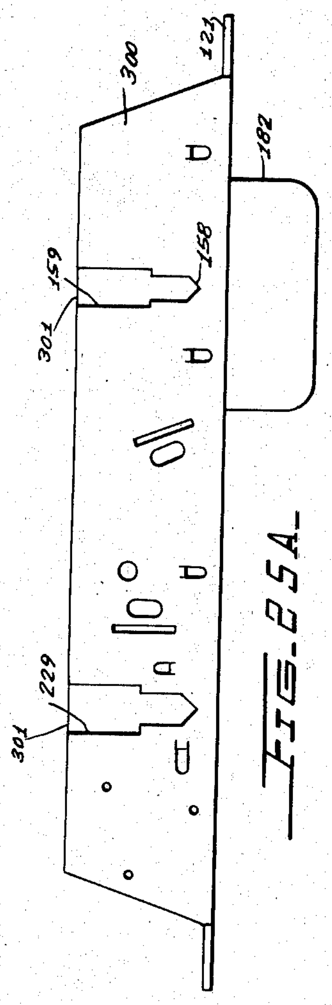

Figure 25*a* is a front view of the chassis of the booster of our invention showing the U-shaped openings for the operating shafts.

Figure 25B:
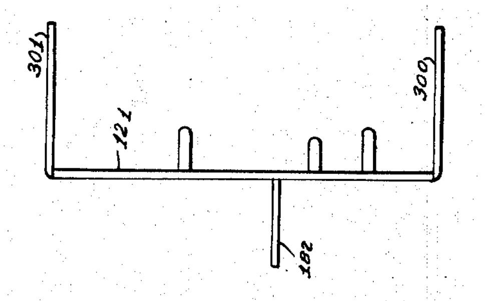

Figure 25*b* is a side view of the chassis of the booster of our invention.

Figure 26B:
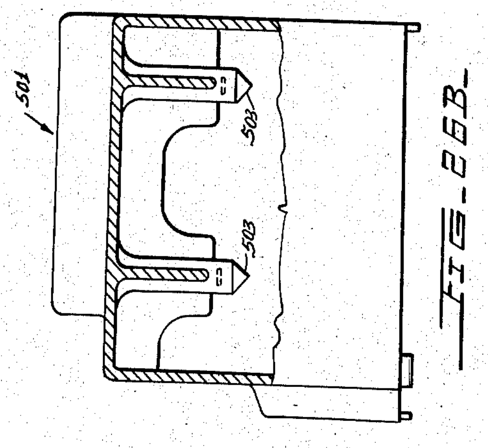
Figure 26:
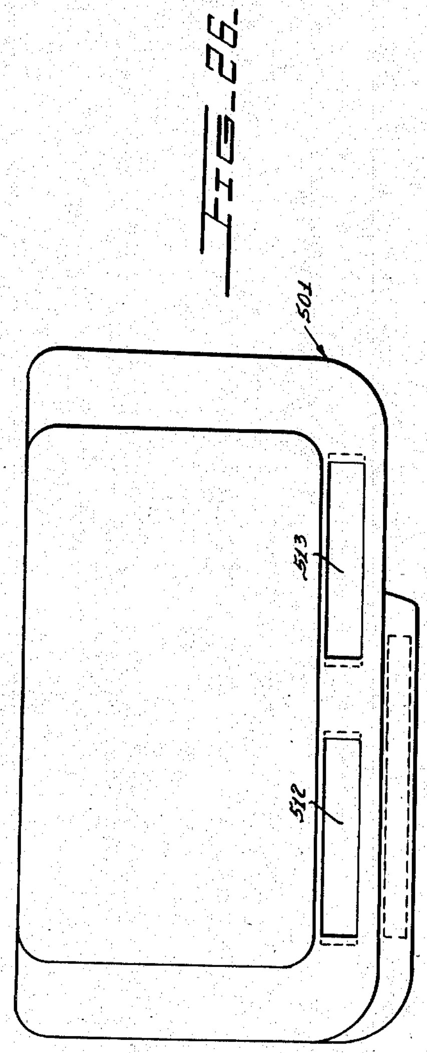

Figure 26 is a plan view of the cabinet of the booster of our invention.

Figure 26A:
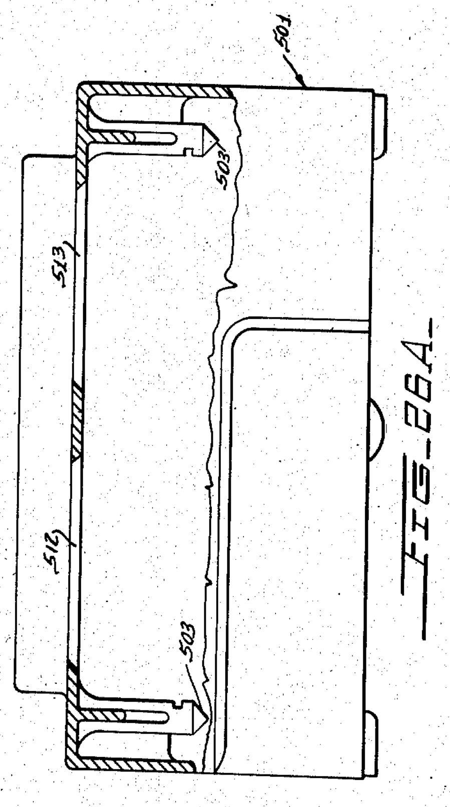

Figure 26*a* is a front view of the cabinet of the booster of our invention with the upper part cut away.

Figure 26*b* is a side view of the cabinet of the booster of our invention with the upper part cut away.

Figure 27:
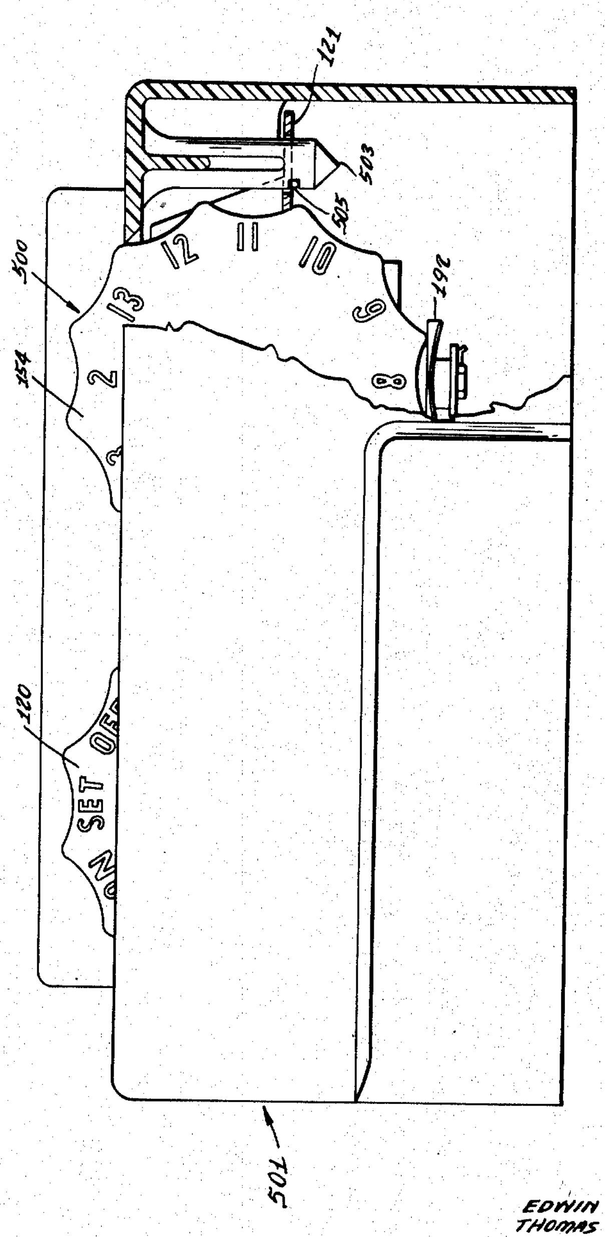

Figure 27 is a front view of the booster of our invention with a portion cut away to show the detent spring of the selector knob.

Figure 28:
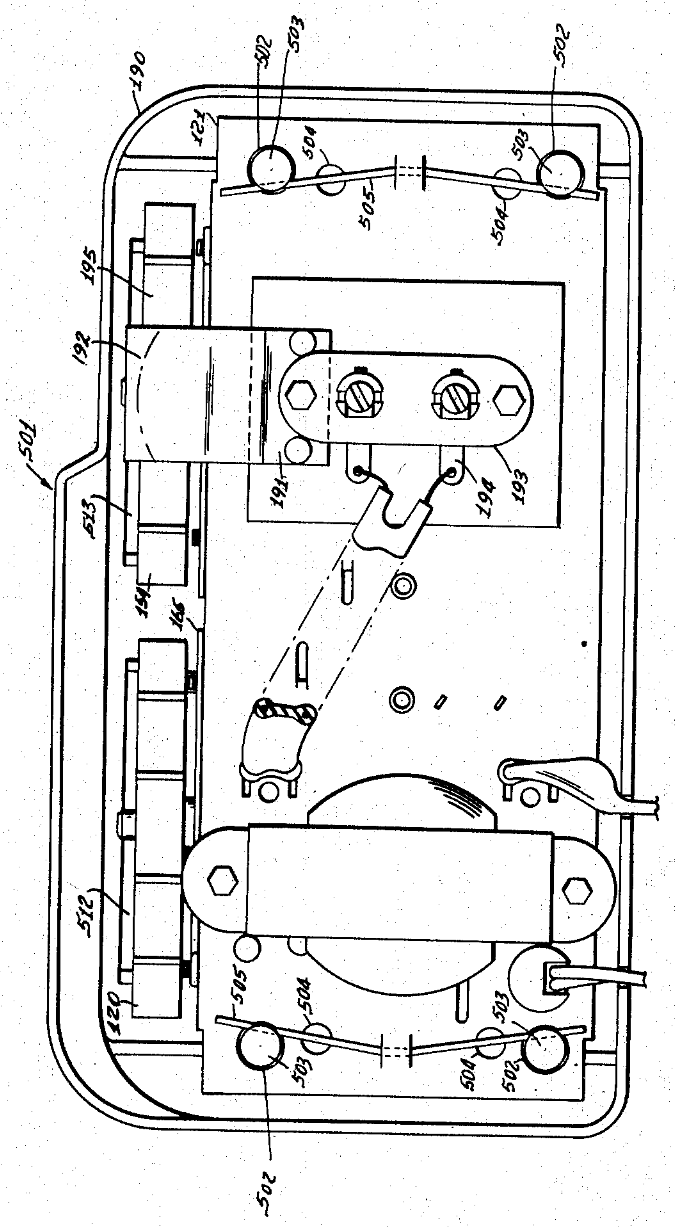

Figure 28 is a bottom view of the booster of our invention showing the chassis mounted in the cabinet.

Our novel booster as previously pointed out comprises novel circuit and mechanical components which are closely interrelated. In the following the electrical circuit elements will be described after a brief description of the mechanical structure of such nature as to form a proper background of the electrical elements. Then, after the description of the electrical elements, a more specific description of each mechanical component will follow so that the detailed mechanical components can be understood in their relation to the electrical elements.

Figures 1, 1A, 1B:
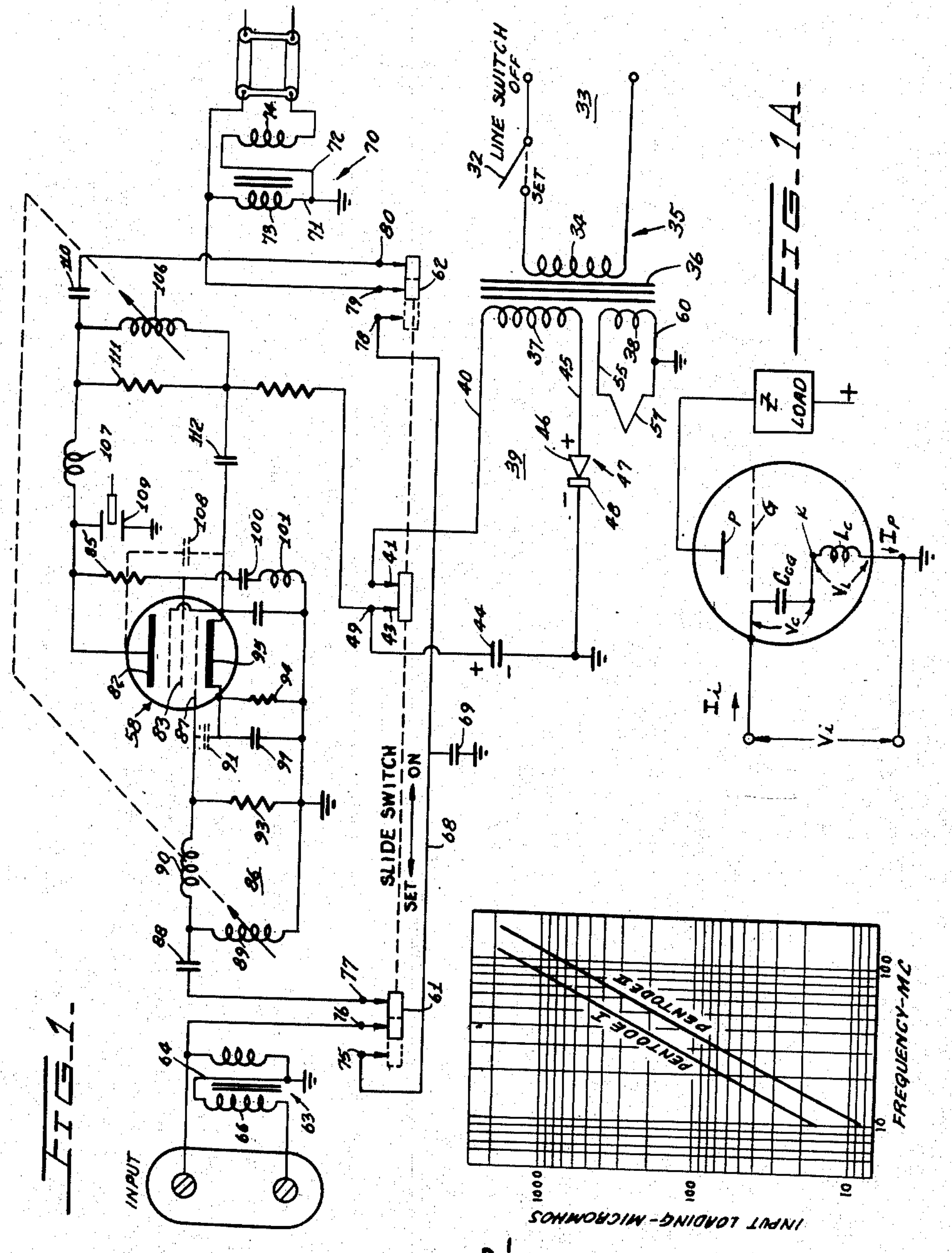
Figure 1C:
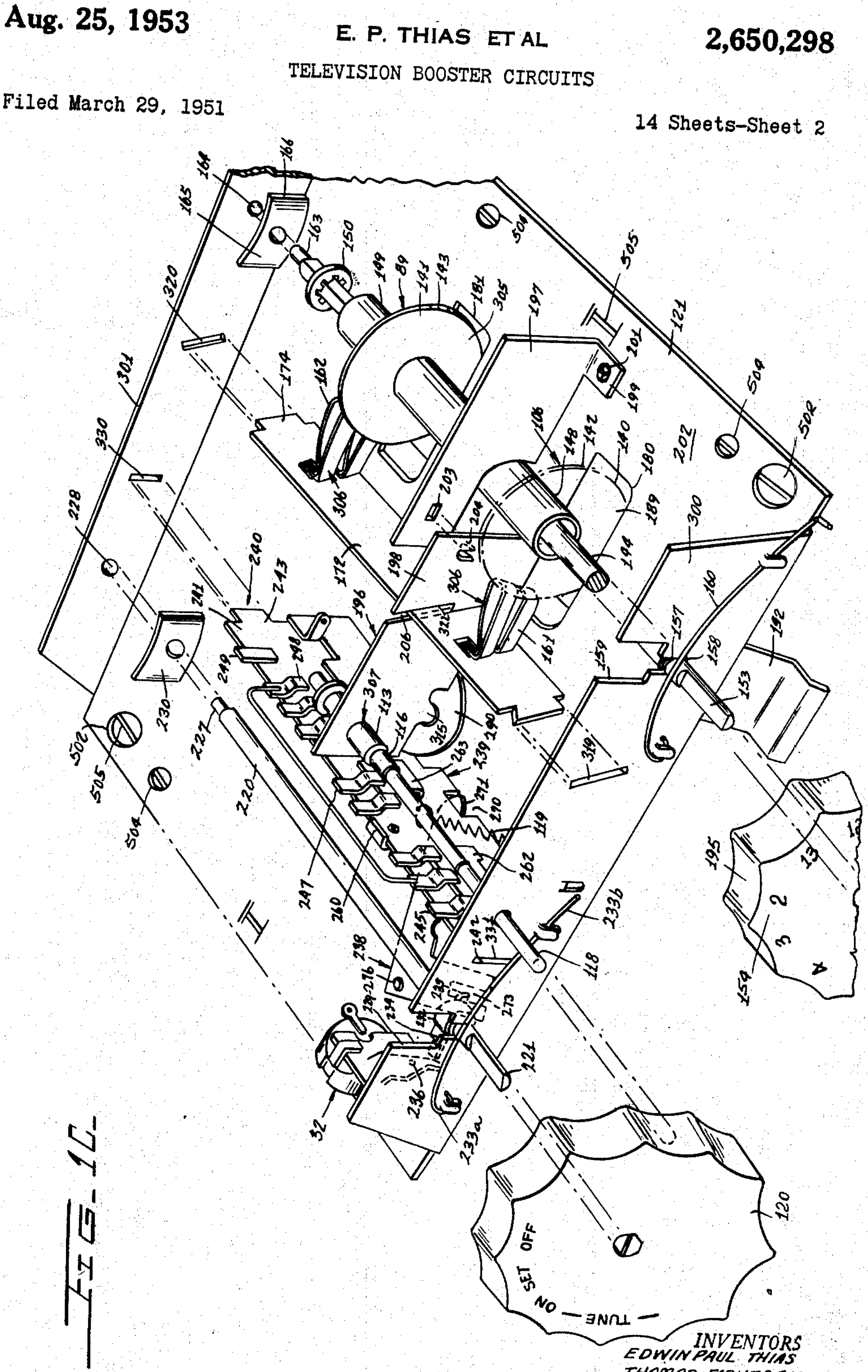

Referring first to Figure 1*c* which shows in expanded or exploded form the mechanical operative structure of our novel booster, the operative elements of the unit are supported on a chassis 121 having a front flange 300 and a rear flange 301. This chassis is in turn mounted in a cabinet 190 (Figures 26, 26*a*, 26*b*) which will be hereafter described in connection with the disclosure of the detailed elements.

The booster structure comprises a plurality of unit assemblies including the principal tuning assembly 305, the contact assembly 306 for the tuning assembly, the fine or vernier tuning capacitor assembly 307, the switching assembly 308 for the "off-set-on" switch structure, the common operating assembly 310 for the fine or vernier tuning capacitor assembly and for the "off-set-on" switch structure.

The principal tuning assembly 305 comprises the main operating shaft 144 to which are keyed the discs 140 and 141 each of insulating material and each of which carries a plurality of inductors 89 and 106, respectively. The arrangement and operation of these inductors is more specifically shown and described in connection with Figures 2, 4 and 4a, the more specific description following the discussion of the electrical elements which makes the particular construction desirable and effective. It should here be pointed out, however, that shaft 144 and its inductors forming the assembly 305 are so arranged that the assembly 305 may be mounted as a unit component on the chassis 121 by insertion of journal extension 163 of shaft 144 in bearing opening 164 in back flange 301 of chassis 121. The front extension 153 of shaft 144 may then be dropped into recess 159 of the front flange 300 of chassis 121 and held in place by spring 165 as hereinafter more specifically described.

The insulating discs 140 and 141 are secured to the insulating sleeve 149 and are integrated with the shaft 144 for rotation therewith by the lock washer 150 so that when the entire principal tuning assembly 305 is mounted in place, the integrated elements mounted on the insulating discs 140 and 141 will rotate with the shaft 144.

The principal tuning knob 154 is secured on the milled flat extension 153 of the shaft 144 and may be operated to rotate the entire tuning assembly.

The base of the chassis 121 is slotted at 180 and 181 to receive, respectively, portions of the insulating discs 141 and 140 thereby serving to diminish the overall height of the unit by permitting a portion of the tuning inductors to operate below the principal level of the chassis and also provide for additional shielding elements as hereinafter more specifically described in connection with the detailed mechanical description following the description of the electrical elements.

It should here be noted, however, that by placing all of the inductors on the insulating discs 140 and 141 and providing for contacts in the contact assembly 306, the necessity for complex electrical connections to a multiplicity of inductors is eliminated and instead connections to the two pairs of contacts 161 and 162 in the contact assembly 306 will be all that is necessary in order to effect appropriate electrical connection to the tuning inductors at all positions thereof.

The angular position of the tuning assembly 305 is, of course, determined by the user in accordance with appropriate markings or indicia indicating channel numbers sequentially on the knob 154.

The position of the tuning assembly 305 at any particular tuning position is maintained by the spring detent 192 secured to the inside of chassis 121 and engaging in the particular recess 195 which at the particular position happens to be at the bottom of the tuning knob.

By this means it will be seen that the entire principal tuning assembly may be a pre-fabricated unit which may after manufacture on its own assembly line merely be inserted in the booster chassis at the appropriate assembly position therefor.

Following the insertion of the principal tuning assembly 305 in the chassis, it is only necessary thereafter to place the shielding plate 197 on the chassis, securing the same thereto by a screw 201 passing through the flange extension 199 of the shielding plate 197.

The shielding between the inductors is then completed by means of shielding plate 198 which is provided with a lug 204 which is entered into the slot 203 in the shielding plate 197 in order to integrate the same and form a single unit.

The left-hand end of shielding plate 198 is provided with an extension 315 which is positioned in the opening 316 of the inverted tube socket 290. Thus, the left-hand portion of the shielding plate 198 not only furnishes additional means of support for the shielding plate 198 but also furnishes a support for the fine or vernier tuning capacitor assembly 307 which will hereinafter be described.

Thereafter the contact assembly 306 may be mounted in position—the contact assembly 306 comprising the insulating supporting plate 172 having locking extensions 173, 174 enterable into opposite slots 319 and 320 in the front flange 300 and the rear flange 301, respectively, of the chassis 121.

The insulating plate 172 is provided with an intermediate transverse slot or notch 322 extending up from the bottom edge thereof which matches and enters the notch 206 extending down from the upper edge of shielding plate 198 so that the notch 322 of the insulating plate 172 serves to prevent longitudinal movement of the insulating plate 172, anchoring it in appropriate position, and the notch 206 serves to prevent any angular rotation of the insulating plate 172, thereby further serving to position the contacts 161 and 162 in accurate relation to the inductors on the insulating inductor carrying discs 140, 141.

Appropriate connections, hereinafter described particularly in connection with Figure 1, must then be made to the contact elements 161 and 162 in order to provide appropriate means for connecting the various inductors in circuit.

The specific structure of contacts 161 and 162 and their operation will, of course, be more clearly understood from the electrical description in connection with Figure 1 and also from the specific mechanical description hereinafter set forth following the electrical description and in connection with Figures 5 and 5a.

Figure 2:
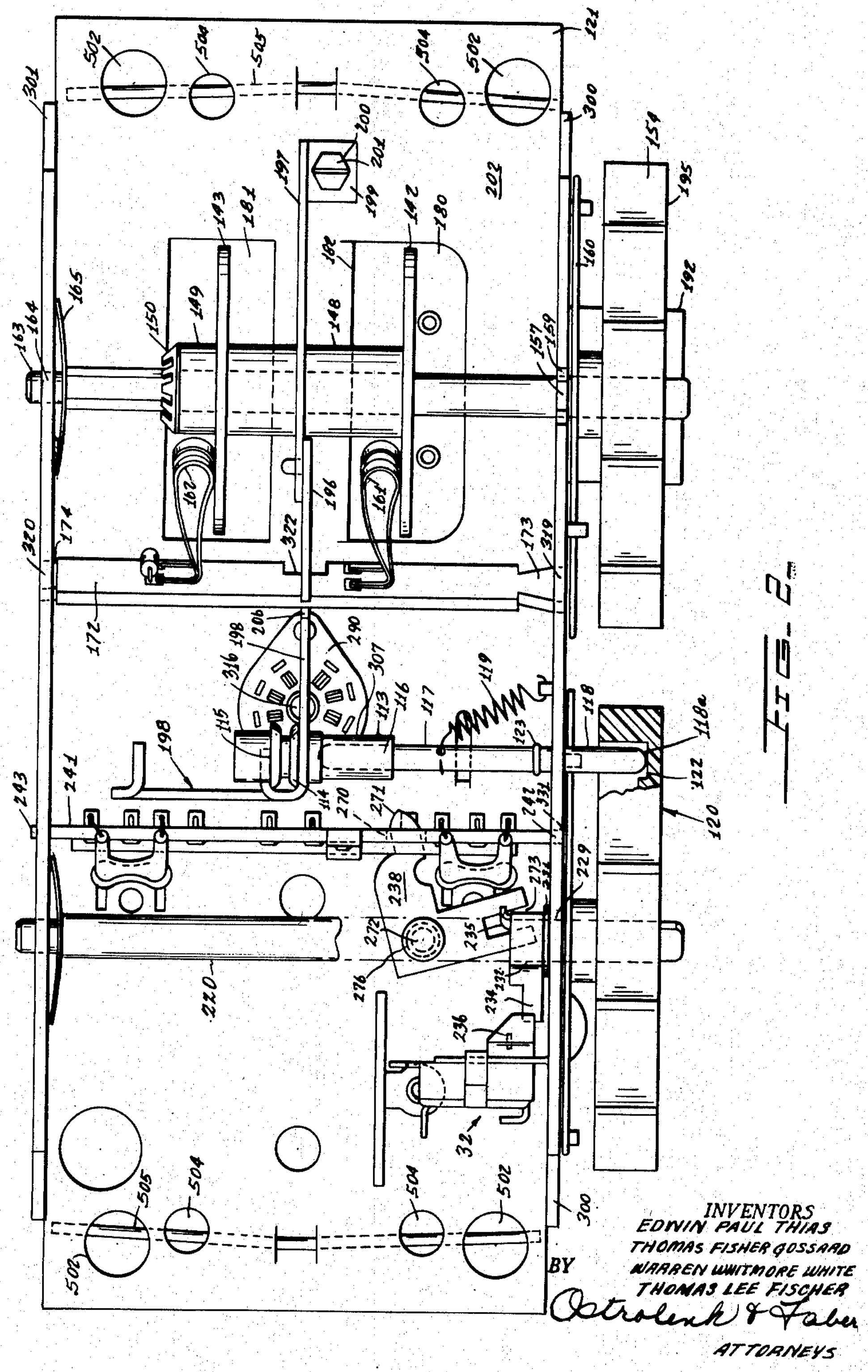
Figure 2 is a plan view showing the chassis assembly of the booster of our invention.

The fine or vernier tuning capacitor assembly 307 comprises a capacitor consisting of electrodes 114 and 115, electrode 114 being concealed in Figure 1c behind plate extension 196 but being visible in Figure 2, the discs 114 and 115 being mounted on the insulating sleeve 113 which is supported by shielding plate 198. The capacitance of the capacitor formed of electrodes 114 and 115 may be varied by the progressive insertion or removal of the conductive rod 116 from the interior of the insulating sleeve 113.

Consequently, the fine or vernier tuning capacitor assembly 307 is positioned in the unit by the mounting on the chassis of the shielding plate 198. The conductive insert 116 is moved in and out of the sleeve 113 by the rotation of knob 120 which is part of the common operating assembly 310 for the capacitor assembly 307 and the "off-set-on" switch structure assembly 308.

Essentially, however, the conductive insert 116 is an extension of the plunger 117 having the cam follower end 118 extending through opening 325 in the front flange 300 of the chassis 121.

Tension spring 119 connecting between the plunger 117 and a stationary portion of the chassis 121, hereinafter more specifically described, draws the plunger 117 and the conductive insert 116 outwardly toward the front of the booster so that the cam follower extension bears against the cam (not shown) on the inside of the operating knob 120.

As the operating knob 120 is rotated in a clockwise direction beyond the "on" position as hereinafter more specifically described in connection with Figures 6, 6a, 6b, 6c and 6d, the cam will drive the cam follower 118 in toward the rear of the booster driving the plunger 117 in the same direction and causing the electrical insert 116 to enter progressively into the sleeve 113, thereby varying the capacitance of the capacitor formed by the electrodes 114 and 115 resulting in a fine or vernier tuning operation.

On rotation of knob 120 in a counterclockwise direction, the tension spring 119 will serve to draw the plunger 117 and insert 116 out of the sleeve 113 or in the opposite direction. The combination switch operating and fine tuning assembly 310 comprises the shaft 220 having the journal 227 insertable in the bearing 228 in the rear flange 301 of the chassis 121 and the front milled extension 221 which may be slipped down into the recess 229 in the front flange 300 of chassis 121.

In the case of both the shaft 144 of the principal tuning assembly 305 and shaft 220 of the switch and fine tuner operating assembly 310, a flat biasing leaf spring 165 and 230 is provided on each of the journals 163 and 227 to bias each shaft toward the front of the unit in order actually to locate the elements of the shaft with respect to the remaining elements of the unit.

The particular way in which these elements are held in place by the various springs 165 and 230 and springs 160 and 233 and the elements with which these springs cooperate as well as elements on the respective shafts which cooperate with other parts of the booster to position them accurately are hereinafter more specifically described following the description of the electrical elements.

The knob 120 may, therefore, be mounted on the shaft 220 even prior to the positioning of the shaft 220 in the unit although it may, of course, be mounted thereon after the positioning of the shaft in the unit and the line-up of all elements.

The switch assembly 308 is more specifically described in connection with Figures 10, 11, 12, 13 and 14. For the purpose of the present brief summary of the construction and operation of the unit, it is sufficient to point out that all of the switch elements are supported by the insulating plate 241 which is provided with an appropriate extension 243 insertable in slot 330 in the back flange 301 of chassis 121, the front of the plate 241 being similarly supported by extension 242 in slot 331 in the front flange 300 of the chassis 121.

Since the specific method of connection achieved by the switch for the various operations is hereinafter described in connection with the electrical description which in turn refers to Figure 1 and since the mechanical operation is set forth in connection with the specific description related to Figures 10 to 14, this specific operation need not here be adverted to.

It is sufficient, however, to point out that all switching operations are achieved by the sliding of movable switch contact carrying plate 239 with respect to the plate 241 which carries the stationary contact elements as hereinafter described.

The movable switch contact carrying plate 239 is integrated as hereinafter described in connection with Figures 10 to 14 so that it will remain mechanically connected to the plate 241 while sliding in a direction parallel thereto in order to effect the various contact arrangements hereinafter described.

The movement of the switch plate 239 is achieved by the bell crank lever 238 arranged for rotation in a horizontal plane and pivoted on the rivet 276 on the base of chassis 121, the said bell crank lever 238 having an extension 271 entering into the slot 270 in the plate 239 so that rotation of the bell crank lever 238 in one direction about its pivot 276 will result in movement of the plate 239 in a corresponding direction and rotation of the bell crank lever 238 in an opposite sense will serve to retract the switch plate 239 to its original position. The bell crank lever 238 is provided with a bifurcated end 273 engageable by the crank pin 235 so that the bell crank lever 238 and, therefore, the entire switch assembly 308 may be operated from the "off" to the "set" to the "on" position and back again by the crank pin which cooperates with the bell crank lever 238.

In the event a fine tuning operation is required, further rotation of knob 120 beyond the "on" position in the tuning area will cause the crank pin 235 to leave the bifurcated end 273 of the bell crank lever 238 so that the entire switch assembly 308 will remain in the "on" position during the fine tuning operation.

However, when it is desired to turn the booster back from the "on" to the "set" position or to the "off" position, turning the knob 120 in a counterclockwise direction from the tuning area to the "on" position will cause the crank pin 235 to engage the bifurcated end 273 of the bell crank lever 238 in order to operate the switch assembly 308 as previously described to the "set" and then to the "off" position.

In order to ensure that the crank pin 235 will have a sufficient entry or bite into or between tines of the bifurcated end 273 of the bell crank lever 238, the bell crank lever 238 is lifted slightly above the floor of chassis 121 by a compression spring, not shown in Figure 1c but shown in Figure 10a, around rivet 276.

The shaft 220 is also provided with the extension 234 which is actually an opposite extension of the crank pin 235 to operate the operating rod 236 of the line switch 32.

In this brief preliminary description we have shown how the booster which will hereinafter be more specifically described for mechanical parts is extremely simple in construction and operation, lends itself to unit sub-assemblies and to simplified manufacturing procedures.

The foregoing is not intended to describe the unit as a whole or even the general operation thereof but has been set forth primarily in order to emphasize the simplicity of the unit as a whole and its potential for simplified, rapid and inexpensive manufacturing procedures.

As previously pointed out, the description will now turn to a thorough discussion of all of the electrically designed elements involved following which the more specific description of the mechanical components will more readily be understood.

Referring to Figure 1 showing the electric design of a preferred embodiment of our present invention, when the booster is turned from the "off" to the "set" position, line switch 32, located between the line 33 and primary winding 34 of power transformer 35, closes the circuit of primary winding 34, thus energizing power transformer 35. Power transformer 35 has an iron core 36 and two secondary windings 37 and 38.

The circuit of winding 37 constitutes the D. C. power supply 39 in which lead 40 of secondary winding 37 is connected to one contact 41 of switch 42 of D. C. power supply 39. The other contact 43 of switch 42 is connected through a large filter capacitor 44 to ground. Lead 45 of secondary winding 37 is connected to the positive plate 46 of rectifier 47.

Rectifier 47 can be of any suitable kind, but a selenium rectifier is here preferred for its compactness, reliability and long life. Cathode 48 of rectifier 47 is connected to ground, thus completing the circuit of secondary winding 37. As previously mentioned, this circuit constitutes D. C. power supply 39, the positive output terminal being connection 49.

One lead 55 of secondary winding 38 of power transformer 35 is connected to one pin of filament heater 47 of main tube 58 which in this preferred embodiment is a 6AK5 R. F. amplifier pentode, the other pin of filament heater 57 and the other lead 60 of secondary winding 38 being both connected to ground.

When, as previously mentioned, the booster is turned from the "off" to the "set" position, switch 32 is closed, thus energizing power transformer 35 and consequently applying the required filament voltage to filament heater 57 of main tube 58. Switch 42 of D. C. power supply 39 on the other hand remains open so that no D. C. voltage is applied to main tube 58. Booster input switch 61 and booster output switch 62, whose mechanical and electrical operation is hereinafter described in connection with switches 32 and 42, remain in the "set" position (shown in Figure 1 by dotted lines).

While switches 61 and 62 are in this position, the booster is by-passed, that is, signals from the antenna (not shown) do not go through the booster and are not, therefore, amplified. More specifically, signals will reach the receiver (not shown) through the following path: from the antenna and the 300 ohm input twin lead (not shown) to the balanced-to-unbalanced input transformer 63. Input transformer 63 is a very small iron core type transformer having one end 65, 65 of each winding 66, 67, respectively, connected to ground to produce the desired change in input from balanced to unbalanced.

This is here necessary because we have assumed the use of a 300 ohm input twin lead which, as is well-known in the art, produces a balanced to ground type input. On the other hand, the booster circuit as here described requires an unbalanced input and hence the need for balanced to unbalanced transformer 63.

If a coaxial line is used to connect the antenna to the booster, an appropriate change in the input connections (not shown) of the booster will make it suitable to receive the unbalanced input from the coaxial line.

Returning to the preferred embodiment of our invention as shown in Figure 1, half of the energy from the antenna is coupled into winding 66 of the balanced to unbalanced input transformer 63, the other half through winding 67 to ground. There is a very close coupling between the two windings 66 and 67 so that eventually the full input power appears across winding 66—67 balanced to ground at an impedance of approximately 50 to 75 ohms.

The unbalanced voltage from winding 67 is switched through switch 61 in its set position so that the input energy is transferred through conductor 68, connected to ground by small capacitor 69 (here 10 micromicrofarads), to the output unbalanced to balanced transformer 70. Output transformer 70 is a small iron core transformer similar to input transformer 63, also has one end 71, 72 of each of the two windings 73, 74 connected to ground, thus performing the reverse action to that described in connection with the input transformer 63.

In other words, the full input power goes into the booster at approximately 50 to 75 ohms and is changed from balanced to unbalanced by input transformer 63. Then output transformer 70 changes the power from unbalanced to balanced, having the two windings 73, 74 of output transformer 70 essentially balanced to ground at approximately 300 ohms to match the normal 300 ohm input to a television receiver.

It should be noted that there is some loss in energy when the booster is in the "off" or "set" position. This loss is partly due to loss in the input and output transformers 63 and 70 and partly due to the capacitance between contacts 75, 76, 77 of switch 61 and ground and that between contacts 78, 79, 80 of switch 62 and ground.

This loss is quite small, being approximately 15% at the frequencies corresponding to channels two and thirteen, and being negligible at the frequencies corresponding to channels six and five.

When the booster is turned from "set" to "on" (Figure 1), switch 42 closes the circuit of D. C. power supply 39, while switches 61 and 62 take their "on" position (shown in continuous lines in Figure 1). Since connection 49 is now at a positive D. C. potential with respect to ground, both plate 82 and screen grid 83 of main tube 58 take their rated positive values, being both connected to D. C. power supply terminal 49 through dropping resistor 84 and dropping resistor 85, respectively.

As previously mentioned, when the booster is turned from "set" to "on," switches 61 and 62 take their "on" position (Figure 1). The input power from the antenna (not shown) goes through the balanced to unbalanced iron core input transformer 63 and thence, being now unbalanced, to the tuned circuit 86 connected to the control grid 87 of pentode 58, through a low capacitance (for example 5 micromicrofarads) coupling capacitor 88. Capacitor 88 transfers the energy from the secondary winding 67 of input transformer 63 which is at a low impedance to the tuned circuit at a higher impedance.

Variable inductor 89 whose novel characteristics are hereinafter described and fixed spirally wound inductor 90 constitute the tuning inductances for the input circuit. These inductances 89, 90 are tuned to the various channel frequencies by a combination of capacitances across them.

These capacitances consist of the grid to cathode capacitance 91 of pentode 58 (shown dotted in Figure 1) in parallel with a combination of capacitance 88 in series with the distributed capacitance of the secondary winding 67 of input transformer 63.

The input point 92 to the tuning inductances 89 and 90 is at a voltage lower than that of the control grid 87 of pentode 28. Fixed inductance 90 might be called a tap down on the tuning inductance and is effective primarily on the high frequency channels. On the low frequency channels point 92, junction between coupling capacitor 88 and inductors 89, 90 is the "hot" side of the tuning inductors 89, 90 for low frequencies, due to the fact that variable inductor 89 has there a much greater inductance than fixed inductor 90. This is partly due to the fact that the input transformer 63 shows a higher output impedance in the low frequency channels than in the high frequency channels. Values of this impedance are in fact approximately 50 ohms for the high frequency channels and 75 to 80 ohms for the low frequency channels.

Tapping down on the total tuning inductance by the insertion of a fixed inductor 90 between the coupling capacitor 88 and control grid 87 of pentode 58 produces a better match between antenna load and input transformer 63 while still allowing the use of a small coupling capacitor 88 which may be 5 micromicrofarads.

The energy from the tuned circuit is applied to control grid 87 of tube 58 through input resistance 93 (in this case of 6800 ohms). Tube 58 is biased by means of a suitable cathode biasing resistor 94 connected to one side of cathode 95, between cathode 95 and ground.

It is well-konwn in the art that cathode lead inductance of a tube, being common to both grid and plate circuits, causes degenerative feedback. By taking advantage of the fact that certain high frequency amplifier tubes (like the 6AK5 used in the present embodiment of our invention) have dual cathode leads, this degenerative feedback can be reduced considerably.

The cathode circuit arrangement to reduce this degenerative feedback is that shown in Figure 1. The plate and screen grid circuits are by-passed by capacitor 96 to one cathode lead, while the control grid biasing resistor 94 and its by-passing capacitor 97 are connected to the other lead. With this arrangement of the cathode circuit, the plate current does not flow through an impedance common to the grid circuit. Therefore, the voltage drop produced across the cathode lead's inductance does not cause feedback.

By-passing capacitors 96 and 97 are here of 1,000 microfarads each. Suppressor grid 98 is connected internally to cathode 95.

Screen grid 83 as previously mentioned is connected to the D. C. supply 39 through dropping resistors 84, 85 (in this case of 1,000 and 10,000 ohms, respectively), thus acquiring a positive D. C. potential. Its R. F. circuit to ground, however, consists of a screen by-pass capacitor 100 (of 1,000 micromicrofarads) in series with a very small inductor 101. The addition of this very small inductance 101 in the circuit of the screen grid 51 of tube 58 increases the gain at the high frequency channels by reducing the input admittance of the pentode amplifier.

As above-mentioned in connection with the cathode circuit of main tube 58, since the tube lead reactances are internal to the tube, there will be coupling between the input and output circuits due to grid and plate currents flowing through the common cathode lead inductance. This introduces degenerative feedback into the stage involving the tube and may cause the grid input admittance to be affected adversely. In general, the effect of the internal tube reactances, due to the interelectrode capacitances and cathode lead inductances, is to decrease the impedance presented at the tube input terminals.

To study this effect, we shall consider a triode since a pentode can be considered a triode whose plate is the pentode screen grid, whose grid is the pentode control grid, and whose cathode is the pentode cathode. At the high television frequencies, the effects of the two reactances are particularly important, the two reactances being caused by cathode leads inductance and cathode to grid capacitance, respectively.

Referring then to Figure 1*a* showing the circuit of a triode with cathode to grid capacitance $C_g$ and cathode lead inductance $L_k$, the signal voltage $V_i$ differs from the voltage $V_c$ that appears between the grid G and the cathode K by the voltage drop $V_I$ in the cathode lead inductance $L_c$.

Thus, $V_i = V_c + V_I$ or (1) $$V_i = V_c + jwL_kI_p$$

where $w$ is equal to $2\pi f$, $f$ being the very high frequency of the input signal V and $I_p$ is the plate current.

The plate current $I_p$ is approximately proportional to the negative of the product of the grid input voltage $V_c$ and the mutual conductance $G_m$ of the tube since at very high frequencies the plate load resistance is usually quite small. We have then:

(2) $$I_p = G_mV_c$$

The input current $I_i$ to the tube will produce a voltage drop across the grid to cathode capacitance $C_{kg}$ that is equal to the tube input voltage $V_c$:

(3) $$V_c = \frac{I_i}{jwC_{kg}}$$

Substituting (3) and (2) in (1) we get (4) $$V_i = \frac{I_i(1 + jwL_kF_m)}{jwC_{kg}}$$

in which the second term in the numerator is numerically small compared with unity. Thus, the input admittance $Y_{in}$ of the tube is approximately (5) $$Y_{in} = \frac{I_i}{V_i} = jwC_{kg}(1 - jwL_kG_m)$$

since $(1+a)^{-1}$ is approximately equal to $(1-a)$ when $a$ is small compared with unity.

The first term of the input admittance $Y_{in}$ (Equation 5) is the normal capacitive susceptance of the tube. The second term is a real positive term representing a conductive component $G_{in}$ of input admittance $Y_{in}$ and having the value $$G_{in} = w^2L_kC_{kg}G_m$$

This input conductance corresponds to a resistance in parallel with the input capacity whose value decreases inversely as the square of the frequency. This resistance consumes power and this consumption increases as the square of the frequency for a given driving voltage. There is no real loss of power involved here since the driving power consumed in this way is simply transmitted to the plate circuit. The equivalent input resistance encountered here can be fairly low. For a tube with a cathode lead inductance of 10–8 henry and a mutual conductance of 9,000 micromhos, operating at a frequency of 30 megacycles, the equivalent input resistance is of the order of 25,000 ohms.

The increase in input loading due to the increase of input conductance with frequency is shown more clearly in Figure 1*b* where experimental values of input loading frequency are plotted for two high frequency pentodes. From these curves it is easily seen that input loading increases proportionally to the square of the frequency of the input signal.

To neutralize this increase in input conductance due to cathode lead inductance, inductor 101, as above-mentioned, is added in series to screen by-passing capacitor 100. Inductance 101 acts to decrease input conductance or tends to neutralize the effect of the cathode lead inductance. The resultant decrease in input conductance or increase in input resistance produces better selectivity and greater resonant use of the voltage applied to the grid, since an increased voltage is now available to the control grid 87 of tube 58. The value of inductance 101 must be small enough so that it has negligible effect on the operation of the booster at the low frequency television channels and at the same time must be of sufficient value to neutralize the decrease of input resistance at the high frequency television channels.

Moreover the inclusion of inductance 101 in the screen grid circuit gives a controllable grid circuit loading device that tends to equalize the gain of the amplifier stage for varying characteristics of the tubes employed.

Plate 82 of tube 58 is connected to the output tuned circuit 105 consisting of variable inductor 106, hereinafter more particularly described, and fixed inductor 107 which is a spirally wound coil. These inductances 106 and 107 are tuned by the plate cathode capacitance 108 (shown dotted in Figure 1) of tube 58 in parallel with the fine tuning capacitance 109, hereinafter described. These inductances 106 and 107 are also tuned by the coupling capacitor 110 (in this case 5 micromicrofarads) in series with the distributed capacity (not shown) of the output transformer 70. Resistor 111 (in this case 6,800 ohms) shunts variable inductor 106, while capacitor 112 connects variable inductor 106 to ground.

As in the input circuit, the output coupling capacitor 110 is connected to the point of junction of the two inductors 106 and 107 to provide a better match through coupling capacitor 110 to the output transformer 70 and also to allow correct tuning on the highest frequency channel (thirteen) without reduction of the tuning inductor 106 to a point that is hard to achieve with the particular type of variable inductor here used.

Both input and output circuit networks are essentially tuned high pass filters consisting of a series capacitance 88 for the input circuit and 110 for the output circuit, shunted by an inductance 89 and 106, respectively. As is well-known in the art, these high pass networks provide a high impedance path for low frequency signals and a low impedance path for high frequency signals. Moreover, most interference signals are low frequency signals, that is, signals having frequencies below the television band. Therefore, the use of high pass networks as coupling networks reduces interference considerably.

The foregoing description of the electrical and circuit components (Figure 1) of our novel booster has referred to various elements, each of which must have a necessary optimum mechanical construction and most of which, in order to produce the best results, have been provided with novel conformations and mechanical arrangements.

These mechanical and physical structures are shown in the remaining figures in which particularly in Figure 2 the compact simplified arrangement of all of the elements may be seen; in Figure 3 the simplified open and accessible spacing and placement of the parts may be understood. The chassis (Figures 25 and 25a) and the cabinet (Figures 26, 26a and 26b) which house, support and space the parts are simplified in design and are arranged for mass production assembly procedures. It should also be noted that all elements are so arranged that the process of mass production assembly is facilitated by the particular shafting, mountings and bearings used.

Since the electrical description in connection with Figure 1 has already described the function of each of the parts, the following specific description covers only the mechanical conformation and operation.

The fine tuning capacitor 109 (Figure 3 and more in detail in Figures 22, 23 and 24) consists of a Bakelite tube 113 with two eyelets 114, 155 on the outside; one eyelet 114 is soldered to the center shield 113; the other 115 is connected to the plate 82 of tube 58. The capacitance of this capacitor 109 is varied by moving a cylindrical copper slug 116 inside tube 113, the copper slug 116 being at a high R. F. potential above ground but below the actual plate potential of tube 58.

Slug 116 (Figure 2) is moved inside tube 113 by plunger 117 rigidly connected to slug 116. Plunger 117 acts as a cam follower in the cam system consisting of cam follower 118, cam 118*a* (Figures 6*c* and 6*d*) and tension spring 119 (Figure 21). Cam 118*a* is an integral part of the "off-set-on" knob 120 (Figure 6) hereinafter described. Tension spring 119, one end of which is secured to the chassis 121 and the other to the plunger 117 is the friction member of the cam system and keeps the cam follower 118 in contact with the cam surface 122 of cam 118*a*.

A stop 123, in this case a wire through a hole in and bent around cam follower 118, limits the travel of slug 116 inside tube 113 and keeps cam follower 118 from moving slug 116 completely out of tube 113.

Tuning inductors 89 and 106 are printed inductors (see Figure 4) in the form of plastic discs 140, 141 (Figure 2) on which the inductances 142, 143 (Figure 4) are printed without any soldered connection, thus requiring considerably less labor and material for their production. Inductors 89 and 106 (Figure 2) are mounted on steel selector shaft 144 having one flat 145 milled in it. The circular discs 140, 141 (Figures 4 and 4*a*) on which the tuning inductors 142, 143 are printed are both mounted on shaft 144 and are registered there at a certain distance one from the other by means of the flap 145, the punching 146 in the center of the disc 141 having one flat side 147 to fit the flat 145.

The two inductors 142, 143 are kept at an appropriate distance by cylindrical insulation sleeves 148, 149 to which they are glued and rigidly secured to shaft 144 by means of lock washer 150.

Shaft 144 (Figure 16) has one flat 145 milled on one side on which the above-mentioned tuning inductor disc 141 is registered with respect to shaft 144. Flat 145 is also registered with flat 153 at the exterior portion of shaft 144 on which the selector knob 154 (Figure 2) is mounted. The holes 155 and 156 punched into the tuning inductor discs 140, 141 preparatory to receiving the inductors 142, 143 are also registered with the flat 153 so that the proper channel numbers will line up when rotating knob 154.

Shaft 144 has a portion of smaller diameter 157 between the end of flat 153 and the beginning of flat 145.

The bottom 158 (Figures 2 or 25*a*) of V-shaped opening 159 on one side of chassis 121 has the same dimension as portion 157 so that it can receive at least two points tangentially of circular portion 157 of shaft 144. Chassis 121 and spring 160 secured at both ends to chassis 121 keeps shaft 144 from moving axially, thus ensuring electrical contact at the proper points between printed circuits 142, 143 and contacts 161, 162, respectively. The opposite end of shaft 144 has a portion of reduced diameter 163 which engages circular bearing 164 of the same diameter and located on the side of the chassis 121 opposite V-shaped opening 159. Between this side of chassis 121 and the end of the flat 145 of shaft 144 there is a rectangular compression spring 165 which holds the shaft 144 in axial tension against the opposite side of chassis 121. Spring 165 (Figures 7 and 7*a*) is a metallic rectangle having a center hole 166 of the same diameter of the end 163 of shaft 144.

Spring contacts 161, 162 (Figures 5 and 5*a*) which make contact with the printed inductors 142, 143 are made in this preferred embodiment of phosphorous bronze on which a layer of silver has been rolled. A dimple 170 is provided at the contacting point 171 to ensure a point contact with the tuning inductors 142, 143. The contact point 171 is necessary to ensure that no changes in inductance occur due to possible varying of the points of contact which might occur if the flat surface of contacts 161, 162 were left without a dimple such as 170. Spring contacts 161, 162, two for each tuning inductor, are secured to an insulation board 172 (Figure 2 or 20) of rectangular shape whose ends 173, 174 engage suitable openings on the sides of the chassis 12*.

From the above description it is seen that the printed inductors 142, 143 form the biasing elements and move with shaft 144 while stationary contacts 162, 161 make a fixed area type of contact with these printed inductors 142, 143. This novel arrangement was found to be the most practical inasmuch as connections to the printed coils 142, 143 can be made without any soldered connections. To arrange the elements in an opposite manner, that is to have the printed inductors stationary and the contacts moving would require that the contacts move through a much greater arc, thus considerably complicating the mechanical requirements of the system and adding to the cost, the size of the unit and the difficulty of assembly.

The tuning inductors 142 and 143 rotate in slots 180, 181 (Figure 2) cut into the main chassis 121. The metal 182 which forms one of these slots 180 is retained and bent down to form the external shield 187 between coils 142 and 143 which is necessary to prevent undesired coupling.

This slot arrangement provides not only for support elements for the tuning inductor shaft but also makes possible a reduction in the overall size of the unit.

An additional shield 188 (Figure 28) is also provided partly for electrical shielding but mainly to meet requirements of the Underwriter standards in that if it were not shielded, a portion 189 of tuning inductor 142 would be accessible from the outside of the cabinet 190 in Figure 28 and since tuning inductor 143 is at approximately 120 v. D. C. with respect to ground, it would constitute hazard for personnel handling the equipment. Referring to Figure 28, this shield 188 further provides a support 191 for the detent spring 192 that gives an indication of correct channel alignment when selector knob 154 is rotated. It also provides a mount 193 for the terminal block 194 for the antenna input to the booster.

Detent spring 192 fixed on mount 141 and engaging depressions 195 on selector knob 154 provides a positive index for an exact setting of the unit by the unskilled home user obviating the necessity for the use of extreme care in tuning or placing the booster in a proper position for each channel. With the detent 192 the channels are automatically and positively positioned when the channel number is closely approached on the selector knob 154.

In the use of a booster, a slight variation of the actual position of selector knob 154 has but a small effect on its operation and the booster would undoubtedly operate sufficiently well even though knob 154 were slightly off its correct detent position.

Referring again to Figure 2, besides the shielding provided by external shield 187, the two inductors 142 and 143 are also shielded from each other by the internal shield 196 consisting of two pieces of sheet metal 197 and 198 (Figures 19 and 17). Shield 197 has an extension 199 folded at 90° with respect to the shield 197. Extension 199 has a center hole 200 through which a screw 201 secures the shield 197 to the top 202 of chassis 180. The other end of shield section 197 has a small circular hole 203 engaged by a small extension 204 of shield section 198. Shield section 198 is essentially a rectangular piece of sheet metal with indentations 205 on the side of the top part 202 of chassis 190. Indentations 205 serve to allow for the parts of the circuit which extend between shield 198 and top part 202 of chassis 190. Shield 198 has appropriate openings 206 and 207 to house insulation board 172 and fine tuning capacitor 109, respectively.

Shield 196 is made of two sections 197 and 198 to facilitate or to make possible the removal of the tuning inductor assembly if for any reason this might be necessary. To remove the removable section 197 it is only necessary to first remove one sheet metal screw 201 and unsolder a spot soldered connection 208 near hole 203 between shield section 197 and section 198.

Switch operating knob 120 (Figures 6, 6*a*, 6*b*, 6*c*, 6*d*) is in this case a plastic moulding of circular shape having an interior circular cam 118*a* consisting of two sections 212, 213, lower section 212 extending for more than half of the circumference 214 of knob 120 and below interior surface 215; higher section 216 rising from lower section 212 up to the whole axial length 217 of knob 120, being then constant 218 and finally descending again 219 below interior surface 215. These cam sections correspond to different positions of the knob 120. When knob 120 is at the "off" position (Figures 6*d* and 21), cam section 217 registers with but does not move cam follower plunger 118; when knob 120 is at the "set" position (Figures 6*d* and 22), the cam section between portions 219 and 218 engages cam follower plunger 118 but does not move the same; when knob 120 is at the "on" position (Figures 6*d* and 23) cam section 278 engages cam follower plunger 118 to operate the same in accordance with the rotation of the knob 120 in the "tune" region.

Knob 120 operates a second shaft 220 (Figures 8, 8*a*, 8*b*) having a single flat 221 at the end 222 on which knob 120 is mounted. Knob 120 is removably mounted on shaft 220 but is kept in place by metal spring 223 inside the partly octagonal 224 and partly circular 225 cylindrical opening 226 biasing flat 221 of shaft 220.

The other end 227 of steel shaft 220 has a smaller diameter to enable it to enter bearing opening 228 (Figure 2) of the same diameter in the opposite side of chassis 127 and aligned with V-shaped opening 229 on the front end of chassis 121. As described in connection with Figures 7 and 7*a*, here too a rectangular metal spring 230 biases shaft 220 axially toward V-shaped opening 229 on the front side of chassis 121. At the front side of chassis 121 but inside the chassis, shaft 220 is provided with a washer 231 and stop 232, hereinafter described, against which spring 230 holds shaft 220 in actual alignment. At the exterior side of the front end of chassis 121, a wire spring 233 secured at both ends 233*a*, 233*b* to chassis 121 keeps shaft 220 from moving along V-shaped opening 229.

Stop 232 is actually a switch actuator (Figures 9, 9*a*) made of sheet steel and spot welded or secured in any other suitable way to shaft 220 and, therefore, rotating with shaft 220. Switch actuator 232 has two extensions 234 and 235; extension 234 is rectangular in shape and operates the switch rod 236 of the axial snap action line switch 32; extension 235 is a cam point operating through switch rocker arm 238, the movable assembly 239 of slide switch 240.

Slide switch 240 (Figures 2, 3, 11, 12, 13) consists of movable assembly 239 and stationary assembly 241. Stationary assembly 241 (Figure 11) is made of plastic and has a rectangular shape.

Its two ends 242 and 243 are smaller so that they can engage appropriate slits in the front and back of chassis 121, respectively. Stationary assembly 241 is provided with a series of circular openings 253 and a smaller number of aligned rectangular openings 250, 251, 252. Spring contacts 244, 245, 247, 248, 249 are secured in any suitable way to circular openings contact posts 253 corresponding to rectangular openings 250, 251, 252. Contacts 244, 245, 247, 248, 249 are connected to their respective electrical components, for example (Figure 2), the output twin lead 247 is connected to contact posts 244 and 245*b*.

To post 253*a* is attached in any suitable way movable assembly guide 260 (in detail see Figures 14, 14*c*) having a central dimple 261 to keep switch movable assembly 239 in close contact with switch stationary assembly 241 while moving with respect to stationary assembly 241. Movable assembly 239 (Figure 12) consists of a plastic rectangular surface on which three contacts 262, 263, 264 (shown in detail in Figures 13, 13*a*, 13*b*) are secured in any suitable way. Rotor contacts 262, 263, 264 are aligned, respectively, with contacts 245, 247, 248 so that when the booster is not operative, they are aligned with contacts 245*c*—245*b*, 247*b*, 248*b*—248*c*, respectively, and when the booster is operative they are aligned with contacts 245*b*—245*a*, 247*a*—247*b*, and 248*a*—248*b*, respectively. Therefore, stationary contacts 245*a*, 245*b*, 245*c* and movable contacts 262 constitute what, in connection with the description of the electrical operation of the booster, was called output switch 62. Stationary contacts 247*a*—247*b* and movable contact 263 constitute D. C. power supply switch 42 and stationary contacts 248*a*—245*b*—248*c* constitute input switch 61. The movable assembly 239 is also provided with a rectangular slot 270 engageable by pin 271 of switch rocker arm 248. Switch rocker arm 238 shown in detail in Figure 10 is a metallic angle pivoted at pivot point 272 and having one extension 271 in the shape of a pin or cam head, while the other rectangular extension 273 is divided by slot 273 into two forks 274 and 275. Fork 274—275 is engaged by cam point 235 of switch actuator 232 which moves the switch movable assembly 239 with respect to switch stationary assembly 241.

Rocker arm 238 is also riveted to chassis 121 at point 272 by means of a shoulder rivet 276 and is spring biased against head 277 of shoulder rivet 276. This biasing action can be achieved in any suitable way, for example, by putting a compression spring between the chassis 121 and the rocker arm 238 at pivot point 272. Biasing rocker arm 238 allows the small cam point 235 of switch actuator 232 to engage and disengage with the slot 273 in rocker arm 238 without fear of the rocker arm 238 subsequently getting into such a position that the cam point 235 might fail to engage slot 273. If some slight movement does take place in slide switch 240 while cam 235 is not engaging slot 273, the fact that rocker arm 238 is spring biased and in a position slightly above the surface of the chassis 121, cam point 235 of switch actuator 232 will tend to depress it slightly and in so doing will allow proper engagement with slot 273 in spite of the slight movement of this rocker arm 238.

To summarize the switch operation of this booster, referring to Figures 21, 22, 23, 24 which correspond to the "off," "set," "on," and "tune" positions of switch knob 120, respectively. When knob 120 is at the "off" position (Figure 21) cam section 219 of knob 120 engages cam follower plunger 118, rectangular extension 234 of actuator 232 pushes spring member 282 rigidly connected to the chassis 121 against rod 236 of axial snap action line switch 32, thus opening line switch 32 while cam point 235 through rocker arm 238 keeps movable assembly 239 in such a position with respect to stationary assembly 241 of slide switch 240 that movable contacts 262, 263, 264 are aligned and make contact with stator contacts 245*b*, 245*c*, 247*b* and 248*b*—248*c*, respectively.

When knob 120 is at the "set" position (Figure 22), cam section between 219 and 218 engages cam follower plunger 118, rectangular extension 234 of actuator 232 is not in engagement with spring member 282, thus closing axial snap action line switch 32, while cam point 235 has rotated rocker arm 238 by a few degrees clockwise but still without changing the contacts between movable assembly 239 and stationary assembly 241 of slide switch 240.

When knob 120 is at the "on" position (Figure 23) cam section 218 engages cam follower plunger 118, rectangular extension 234 of actuator 232 is not in engagement with spring member 282 so that line switch 32 is closed, while cam point 235 has rotated rocker arm 238 clockwise to a position where pin 271 is so positioned that rotor contacts 262, 263, 264 are aligned and make contact with stator contacts 245*a*—245*b*, 247*a*—247*b*, 248*a*—248*b*, respectively. The booster is now in operation.

Whenever knob 120 is at the "tune" position (Figure 24) cam section 216—217 engages cam follower plunger 118 so that slug 116 is half way between its true limiting position inside tube 113, rectangular extension 234 of actuator 232 is not in engagement with spring member 282 so that line switch 32 is closed, while cam point 235 has disengaged from slot 273 after having rotated clockwise rocker arm 238 to its final position which is only a few degrees beyond the position corresponding to the "on" position of knob 120 so that rotor contacts 262, 263, 266 make contact with the same contacts 245a—245b, 247a—247b, 248a—248b, respectively, as in the case where knob 120 was at the "on" position. Therefore, the only important change is in the position of slug 116 in tube 113, that is, the value of the fine tuning capacitance 109 is now different from what it was for the position "on" of knob 120.

Most of the parts of this booster are installed by means of slots in the chassis 121 itself, making use of the chassis metallic material for mounting purposes. In assembly the tube sockets 290 is first riveted to the chassis 121. Then the center shield 196 is secured on and soldered on where required. Approximately half of the bypass condensers and other parts are then assembled and soldered in place, at which time the accessibility is very good and no trouble should be experienced in installing these parts. The slide switch 240 and tuning inductor contacts 161, 162 are then installed and soldered in place.

The complete booster chassis assembly 500 (Figures 25, 26, 27 and 28) with all operating parts is then mounted as a unit in plastic cabinet 501 by means of four holes 502 in the main chassis 121 which fit over four corresponding posts 503 in the plastic cabinet. An access hole 504 is also included near each of the four mounting holes 502 in the chassis 121 by which means a screw driver or other instrument may depress the retaining wire spring 505 secured in any suitable way to chassis 121 and allow the removal of the complete chassis assembly 500 from the cabinet 501.

The upper portion of the cabinet 501 is provided with slots 512 and 513 through which the upper portion of knobs 120 and 154 project to be accessible for operation of the unit.

In the foregoing we have described our invention solely in connection with specific illustrative embodiments thereof. Since many variations and modifications of our invention will now be obvious to those skilled in the art, we prefer to be bound not by the specific disclosures herein contained but only by the appended claims.

We claim:

1. In an amplifier comprising an input circuit, an output circuit, an electronic tube, a power supply; said power supply comprising a power transformer, said power transformer having one primary winding, an iron core and two secondary windings; a line switch, two power input terminals, one side of said primary winding being connected to one side of said line switch, the other side of said line switch being connected to one of said input terminals, the other side of said primary winding being connected to the second of said input terminals; a rectifier, a filter condenser and an output switch; one side of the first of said secondary windings being connected to one contact of said output switch; the other contact of said output switch being connected to one plate of said filter condenser and to the plate screen grid circuits of said electron tube, the other plate of said filter condenser being connected to ground, the other side of the first of said secondary windings being connected to the first element of said rectifier, the second element of said rectifier being connected to ground, the path of lower resistance being from the second element to the first element of said rectifier; one side of the second of said secondary windings being connected to one side of the filament of said electron tube, the other side of said filament being connected to ground, the other side of the second of said secondary windings being also connected to ground.

2. In an amplifier comprising an input circuit, an output circuit, an electron tube; said input circuit being connected to the input terminals of said electron tube, said output circuit being connected to the output terminals of said electron tube, an input balance to unbalance transformer and an antenna, said input transformer unbalancing the balanced input from said antenna, said input transformer matching said antenna to said input circuit; an output unbalance to balance transformer and a receiver; said output transformer balancing the unbalanced output from said electronic tube, said output transformer matching said output circuit to said receiver, a power supply, said power supply heating the filament of said electronic tube, said power supply applying a positive potential with respect to ground to the plate of said electron tube.

3. In an amplifier comprising an input circuit, an output circuit, an electron tube, said input circuit being connected to the input terminals of said electron tube; said output circuit being connected to the output terminals of said electron tube, an input transformer and an antenna, antenna leads connecting said antenna to said input transformer, said input transformer comprising two windings, one end of each of said windings being grounded, the ungrounded ends of said windings being connected to said antenna leads, an input switch having a plurality of positions, one contact of said input switch being connected to one of the ungrounded ends of said windings; an output transformer and a receiver; receiver leads connecting said output transformer to said receiver; said output transformer comprising two windings, one end of each of said windings being grounded, the ungrounded ends of said windings being connected to said receiver leads, an output switch having a plurality of positions, one contact of said output switch being connected to one of the ungrounded ends of said output transformer winding; said input and output switches being simultaneously operable and in one of their positions connecting said input transformer to said output transformer by-passing said input circuit, said output circuit and said electron tube.

4. In an amplifier comprising an input circuit, an output circuit, an electron tube; said input circuit being connected to the input terminals of said electron tube, said output circuit being connected to the output terminals of said electron tube, an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit; said input and output switches in another than said one position connecting said input transformer to said input circuit and said output circuit to said output transformer, respectively.

5. In an amplifier comprising an input circuit, an output circuit, an electron tube; said input circuit being connected to the input terminals of said electron tube, said output circuit being connected to the output terminals of said electron tube; said input circuit comprising a parallel tuned circuit, said tuned circuit having a fixed capacitance and a discontinuously variable inductance adapted to parallel resonate at the frequency of each television channel; said output circuit comprising a parallel tuned circuit, said output tuned circuit having also a fixed capacitance and a discontinuously variable inductance also adapted to parallel resonate at the frequency of each television channel; an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

6. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at the frequency of each television channel, said output circuit comprising a tuned circuit also adapted to parallel resonate at the frequency of each television channel; an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

7. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at some preestablished frequencies, said output circuit comprising a tuned circuit also adapted to parallel resonate at the said preestablished frequencies; an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

8. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at the frequency of each television channel, said output circuit comprising a tuned circuit also adapted to parallel resonate at the frequency of each television channel, a screen grid by-passing circuit, said screen grid by-passing circuit comprising an inductance and a capacitance in series connecting the screen grid of said electron tube to ground, said inductance neutralizing the effect of cathode lead inductance of said electron tube, said screen grid circuit inductance increasing the input resistance of said electron tube; an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

9. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at some preestablished frequencies, said output circuit comprising a tuned circuit also adapted to parallel resonate at the said preestablished frequencies, a screen grid by-passing circuit, said screen grid by-passing circuit comprising an inductance and a capacitance in series connecting the screen grid of said electron tube to ground, said inductance neutralizing the effect of cathode lead inductance of said electron tube, said screen grid circuit inductance increasing the input resistance of said electron tube; an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

10. In an amplifier comprising an input circuit, an output circuit, an electron tube; said input circuit being connected to the input terminals of said electron tube, said output circuit being connected to the output terminals of said electron tube, said input circuit comprising a tuned circuit adapted to parallel resonate at the frequency of each television channel; said output circuit comprising a tuned circuit also adapted to parallel resonate at the frequency of each television channel; said electron tube having two cathode leads, a cathode circuit comprising a biasing resistance in parallel with a by-passing capacitance connected between one of said cathode leads and ground; a second by-passing capacitance connected to the second of said cathode leads and ground, said cathode circuit effectively uncoupling said output circuit from said input circuit, an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

11. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at the frequency of each television channel, said output circuit comprising a tuned circuit also alapted to parallel resonate at the frequency of each television channel, a screen grid by-passing circuit, said screen grid by-passing circuit comprising an inductance and a capacitance in series connecting the screen grid of said electron tube to ground, said inductance neutralizing the effect of cathode lead inductance of said electron tube, said screen grid circuit inductance increasing the input resistance of said electron tube; said electron tube having two cathode leads, a cathode circuit comprising a biasing resistance in parallel with a by-passing capacitance connected between one of said cathode leads and ground; a second by-passing capacitance connected to the second of said cathode leads and ground, said cathode circuit effectively uncoupling said output circuit from said input circuit, an input transformer and an antenna, said input transformer matching said antenna to said input circuit, an input switch having a plurality of positions, said input switch being between said input transformer and said input circuit; an output transformer and a receiver; said output transformer matching said output circuit to said receiver, an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

12. In an amplifier comprising an input circuit, an output circuit, an electron tube; said input circuit being connected to the input terminals of said electron tube, said output circuit being connected to the output terminals of said electron tube; said input circuit comprising a tuned circuit adapted to parallel resonate at some preestablished frequencies, said output circuit comprising a tuned circuit also adapted to parallel resonate at the said preestablished frequencies; a screen grid by-passing circuit, said screen grid by-passing circuit comprising an inductance and a capacitance in series connecting the screen grid of said electron tube to ground, said inductance neutralizing the effect of cathode lead inductance of said electron tube, said screen grid circuit inductance increasing the input resistance of said electron tube; said electron tube having two cathode leads, a cathode circuit comprising a biasing resistance in parallel with a by-passing capacitance connected between one of said cathode leads and ground; a second by-passing capacitance connected to the second of said cathode leads and ground, said cathode circuit effectively uncoupling said output circuit from said input circuit, an input transformer and an antenna, said input transformer matching said antenna to said input circuit, an input switch having a plurality of positions, said input switch being between said input transformer and said input circuit; an output transformer and a receiver; said output transformer matching said output circuit to said receiver; an output switch having a plurality of positions, said output switch being between said output circuit and said output transformer; said input and output switch being simultaneously operable and in one of said positions by-passing said input circuit, said electronic tube and said output circuit, said input and output switches in another than said one position connecting said input transformer to said input circuit and said output circuit to said output transformer, respectively.

13. A high frequency amplifier comprising a pentode, an output circuit and an input circuit; said output circuit being connected to the screen grid of said pentode, said screen having a connection to ground; said connection comprising an inductor and a capacitor in series; said inductor having a relatively low inductance being effective at very high frequencies; said input circuit comprising a high pass coupling circuit, an input transformer preceding said high pass circuit, the low impedance energy at the output of said input transformer being changed into high impedance energy at the said high pass circuit.

14. A high frequency amplifier comprising a pentode, an output circuit and an input circuit; said output circuit being connected to the screen grid of said pentode, said screen having a connection to ground; said connection comprising an inductor and a capacitor in series; said inductor having a relatively low inductance being effective at very high frequencies; said input circuit comprising a high pass coupling circuit; an input transformer preceding said high pass circuit, the low impedance energy at the output of said input transformer being changed into high impedance energy at the said high pass circuit, and said output circuit comprising a high pass coupling circuit.

15. A high frequency amplifier comprising a pentode, an output circuit and an input circuit; said output circuit being connected to the screen grid of said pentode, said screen having a connection to ground; said connection comprising an inductor and a capacitor in series; said inductor having a relatively low inductance being effective at very high frequencies; said input circuit comprising a high pass coupling circuit; an input transformer preceding said high pass circuit, the low impedance energy at the output of said input transformer being changed into high impedance energy at the said high pass circuit, and said output circuit comprising a high pass coupling circuit; said input circuit impedance matching the input signal, said output circuit being impedance matched.

16. A high frequency amplifier comprising a pentode, an output circuit and an input circuit; said output circuit being connected to the screen grid of said pentode, said screen having a connection to ground; said connection comprising an inductor and a capacitor in series, said inductor having a relatively low inductance being effective at very high frequencies; said input circuit comprising a high pass coupling circuit; an input transformer preceding said high pass circuit, the low impedance energy at the output of said input transformer being changed into high impedance energy at the said high pass circuit, and said output circuit comprising a high pass coupling circuit; said input circuit impedance matching the input signal, said output circuit being impedance matched; said input and output signals being balanced; said input signal becoming unbalanced to said pentode.

17. A radio frequency tuning unit adapted particularly to neutralize cathode lead inductance effect comprising a shaft; means for rotating said shaft; an insulating member mounted on said shaft and rotatable therewith; a plurality of inductors on said insulating member; a pair of contacts engaging said insulating member and in the path of movement of said inductors; angular movement of said shaft to different positions changing the inductor bridging said contacts; a chassis; said chassis having a main platform and support flanges; said shaft being carried by said support flanges parallel to said platform; a slot in said main platform; a portion of said insulating member and its inductors extending in said slot.

18. A radio frequency tuning unit adapted particularly to neutralize cathode lead inductance effect comprising a shaft; means for rotating said shaft; an insulating member mounted on said shaft and rotatable therewith; a plurality of inductors on said insulating member; a pair of contacts engaging said insulating member and in the path of movement of said inductors; angular movement of said shaft to different positions changing the inductor bridging said contacts; a chassis; said chassis having a main platform and support flanges; said shaft being carried by said support flanges parallel to said platform; a slot in said main platform; a portion of said insulating member and its inductors extending in said slot; material of said platform bent from said slot forming a shielding flange for said inductors.

19. A radio frequency tuning unit adapted particularly to resonance at high frequency, comprising a shaft; means for rotating said shaft; a plurality of insulating members mounted on said shaft and rotatable therewith; a plurality of inductors on each insulating member; a pair of contacts individual to engaging each of said insulating members and in the path of movement of said inductors; angular movement of said shaft to different positions changing the inductors on each insulating member bridged by the pair of contacts individual to the insulating member; a chassis; said chassis having a main platform and support flanges; said shaft being carried by said support flanges parallel to said platform; slots in said main platform individual to each insulating member and receiving a portion of each insulating member and its inductors.

20. A radio frequency tuning unit adapted particularly to resonance at high frequency, comprising a shaft; means for rotating said shaft; a plurality of insulating members mounted on said shaft and rotatable therewith; a plurality of inductors on each insulating member; a pair of contacts individual to engaging each of said insulating members and in the path of movement of said inductors; angular movement of said shaft to different positions changing the inductors on each insulating member bridged by the pair of contacts individual to the insulating member; a chassis; said chassis having a main platform and support flanges; said shaft being carried by said support flanges parallel to said platform; slots in said main platform individual to each insulating member and receiving a portion of each insulating member and its inductors; shields for the inductors at each slot, said shields being carried by said main platform.

21. A radio frequency tuning unit adapted particularly to resonance at high frequency, comprising a shaft; means for rotating said shaft; an insulating member mounted on said shaft and rotatable therewith; a plurality of inductors on said insulating member; a pair of contacts engaging said insulating member and in the path of movement of said inductors; angular movement of said shaft to different positions changing the inductor bridging said contacts; a chassis, said chassis having a main platform and support flanges; said shaft being carried by said support flanges parallel to said platform; a slot in said main platform; a portion of said insulating member and its inductors extending in said slots; material of said platform bent from said slot forming a shielding flange for said inductors; and additional shielding members for said inductors carried by said chassis.

22. A radio frequency tuning unit adapted particularly to resonance at high frequency, comprising a shaft; means for rotating said shaft; a plurality of insulating members mounted on said shaft and rotatable therewith; a plurality of inductors on each insulating member; a pair of contacts individual to engaging each of said insulating members and in the path of movement of said inductors; angular movement of said shaft to different positions changing the inductors on each insulating member bridged by the pair of contacts individual to the insulating member; a chassis; said chassis having a main platform and support flanges; said shaft being carried by said support flanges parallel to said platform; slots in said main platform individual to each insulating member and receiving a portion of each insulating member and its inductors; shields for the inductors at each slot, said shields being carried by said main platform; said tuning unit having additional circuit components; and extension of at least one of said shields; some of said circuit components being carried by said extension.

23. A high frequency amplifier comprising a multi-element electrode electron tube, an output circuit and an input circuit, said output circuit being connected to the plate of said electron tube, the screen grid of said electron tube having a connection to ground, said connection comprising an inductor and a capacitor in series, said inductor having a relatively low inductance being effective at very high frequencies, said input circuit comprising a tuned circuit, a variable inductance for tuning said tuned circuit, a second inductance connected between said tuning inductance and the control grid of said electron tube, said tuning inductor having greater inductance than said second inductor at the low frequencies, and an input transformer having a higher output impedance at low frequencies than at the high frequencies.

24. A high frequency amplifier comprising a multi-element electrode electron tube, an output circuit and an input circuit, said output circuit being connected to the plate of said electron tube, the screen grid of said electron tube having a connection to ground, said connection comprising an inductor and a capacitor in series, said inductor having a relatively low inductance being effective at very high frequencies, said input circuit comprising a tuned circuit, a variable inductance for tuning said tuned circuit, a second inductance connected between said tuning inductance and the control grid of said electron tube, said tuning inductor having greater inductance than said second inductor at the low frequencies, an input transformer having a higher output impedance at low frequencies than at the high frequencies, said second inductance producing good matching between said input transformer and said electron tube.

EDWIN PAUL THIAS.
THOMAS LEE FISCHER.
THOMAS FISHER GOSSARD.
WARREN WHITMORE WHITE.

References Cited in the file of this patent

UNITED STATES PATENTS

| Number | Name | Date |
|---|---|---|
| 2,157,870 | Sowers | May 9, 1939 |
| 2,223,049 | Reichle | Nov. 26, 1940 |
| 2,228,112 | Hansell | Jan. 7, 1941 |
| 2,262,956 | Newbold | Nov. 18, 1941 |
| 2,373,184 | Herold | Apr. 10, 1945 |
| 2,434,299 | Van Loon | Jan. 13, 1948 |
| 2,491,809 | Tyler | Dec. 20, 1949 |
| 2,497,747 | Valdettaro | Feb. 14, 1950 |
| 2,532,263 | Silvey | Nov. 28, 1950 |
| 2,543,560 | Thias | Feb. 27, 1951 |
| 2,545,681 | Zepp et al. | Mar. 20, 1951 |
| 2,549,992 | Strutt et al. | Apr. 24, 1951 |

FOREIGN PATENTS

| Number | Country | Date |
|---|---|---|
| 63,589 | Denmark | June 11, 1945 |
| 72,975 | Norway | Jan. 12, 1948 |